United States Patent
Arnold et al.

(10) Patent No.: US 8,677,317 B2
(45) Date of Patent: *Mar. 18, 2014

(54) SIMPLIFIED DEPLOYMENT MODELING

(75) Inventors: William C. Arnold, Mahopac, NY (US);
Daniel C. Berg, Holly Springs, NC (US); Brad L. Blancett, Raleigh, NC (US); Tamar Eilam, New York, NY (US); Michael D. Elder, Durham, NC (US); Chad Holliday, Holly Springs, NC (US); Michael H. Kalantar, Chapel Hill, NC (US); Alexander V. Konstantinou, New York, NY (US); Timothy A. Pouyer, Greenville, SC (US); Narinder Makin, Morrisville, NC (US); Harm Sluiman, Scarborough, CA (US); Edward C. Snible, Bronx, NY (US); John E. Swanke, Terryville, CT (US); Alexander A. Totok, New York, NY (US); Andrew N. Trossman, North York, CA (US)

(73) Assignee: International Business Machines Corporation, Armonk, NY (US)

(*) Notice: Subject to any disclaimer, the term of this patent is extended or adjusted under 35 U.S.C. 154(b) by 27 days.

This patent is subject to a terminal disclaimer.

(21) Appl. No.: 13/435,506

(22) Filed: Mar. 30, 2012

(65) Prior Publication Data

US 2012/0192146 A1  Jul. 26, 2012

Related U.S. Application Data

(63) Continuation of application No. 12/181,737, filed on Jul. 29, 2008, now Pat. No. 8,291,378.

(51) Int. Cl.
*G06F 9/44* (2006.01)

(52) U.S. Cl.
USPC ........... 717/120; 717/105; 717/109; 717/110; 717/119

(58) Field of Classification Search
None
See application file for complete search history.

(56) References Cited

U.S. PATENT DOCUMENTS

| 5,950,011 | A | 9/1999 | Albrecht et al. |
| 5,970,490 | A | 10/1999 | Morgenstern |
| 6,256,773 | B1* | 7/2001 | Bowman-Amuah ......... 717/121 |
| 6,629,065 | B1 | 9/2003 | Gadh et al. |
| 6,701,514 | B1 | 3/2004 | Haswell et al. |

(Continued)

OTHER PUBLICATIONS

Issac Tuku Tecklu; Notice of Allowance and Fees Due; U.S. Appl. No. 12/181,737, filed Jun. 13, 2012; United States Patent and Trademark Office.

(Continued)

*Primary Examiner* — Isaac Tecklu
(74) *Attorney, Agent, or Firm* — Stevens & Showalter LLP

(57) ABSTRACT

A deployment modeling platform enables a user to model application characteristics of target software and to associate application modeling parameters to the modeled application characteristics. A user may also model environment characteristics of a target deployment environment and to associate environment modeling parameters to the modeled deployment environment characteristics. Still further, a user may create a deployment model that associates and maps selected parameters of the modeled application characteristics of the target software to associated parameters of the modeled environment characteristics of the deployment environment, and to verify that each parameter that relates to a requirement is mapped to and is fulfilled by an associated parameter that relates to a corresponding capability to determine whether validation problems exist in order to deploy the target software in the associated deployment environment.

14 Claims, 16 Drawing Sheets

(56) References Cited

U.S. PATENT DOCUMENTS

| | | |
|---|---|---|
| 6,789,054 B1 | 9/2004 | Makhlouf |
| 6,795,089 B2 | 9/2004 | Rajarajan et al. |
| 7,050,872 B2 | 5/2006 | Matheson |
| 7,069,541 B2 * | 6/2006 | Dougherty et al. ............ 717/122 |
| 7,069,553 B2 | 6/2006 | Narayanaswamy et al. |
| 7,103,874 B2 | 9/2006 | McCollum et al. |
| 7,134,122 B1 * | 11/2006 | Sero et al. ..................... 717/177 |
| 7,196,712 B2 | 3/2007 | Rajarajan et al. |
| 7,320,120 B2 | 1/2008 | Rajarajan et al. |
| 7,370,315 B1 | 5/2008 | Lovell et al. |
| 7,463,263 B2 | 12/2008 | Gilboa |
| 7,568,019 B1 | 7/2009 | Bhargava et al. |
| 7,630,877 B2 | 12/2009 | Brown et al. |
| 7,643,597 B2 | 1/2010 | Liu et al. |
| 7,665,085 B2 | 2/2010 | Sundararajan et al. |
| 7,669,137 B2 | 2/2010 | Chafe et al. |
| 7,735,062 B2 | 6/2010 | de Seabra e Melo et al. |
| 7,779,383 B2 | 8/2010 | Bornhoevd et al. |
| 7,900,201 B1 | 3/2011 | Qureshi et al. |
| 7,962,891 B2 | 6/2011 | Kimelman et al. |
| 2003/0037327 A1 | 2/2003 | Cicciarelli et al. |
| 2003/0084156 A1 | 5/2003 | Graupner et al. |
| 2003/0163450 A1 | 8/2003 | Borenstein et al. |
| 2004/0177352 A1 * | 9/2004 | Narayanaswamy et al. .. 717/169 |
| 2004/0179011 A1 | 9/2004 | Marshall |
| 2004/0261053 A1 * | 12/2004 | Dougherty et al. ............ 717/101 |
| 2005/0055692 A1 | 3/2005 | Lupini et al. |
| 2005/0198244 A1 | 9/2005 | Eilam et al. |
| 2005/0204354 A1 * | 9/2005 | Sundararajan et al. ....... 717/174 |
| 2006/0053410 A1 | 3/2006 | Charisius et al. |
| 2006/0066627 A1 | 3/2006 | Gerhard et al. |
| 2006/0101091 A1 | 5/2006 | Carbajales et al. |
| 2006/0101445 A1 | 5/2006 | Carbajales et al. |
| 2006/0168558 A1 * | 7/2006 | de Seabra e Melo et al. 717/105 |
| 2006/0235733 A1 | 10/2006 | Marks |
| 2006/0271909 A1 | 11/2006 | Huang et al. |
| 2007/0074203 A1 | 3/2007 | Curtis et al. |
| 2007/0168925 A1 * | 7/2007 | Bornhoevd et al. ........... 717/104 |
| 2007/0179823 A1 | 8/2007 | Bhaskaran et al. |
| 2007/0277151 A1 | 11/2007 | Brunel et al. |
| 2007/0288885 A1 | 12/2007 | Brunel et al. |
| 2008/0028365 A1 | 1/2008 | Erl |
| 2008/0082959 A1 | 4/2008 | Fowler |
| 2008/0127049 A1 | 5/2008 | Elaasar |
| 2008/0183725 A1 | 7/2008 | Blakeley et al. |
| 2008/0313008 A1 | 12/2008 | Lee et al. |
| 2008/0313595 A1 | 12/2008 | Boulineau et al. |
| 2008/0313596 A1 | 12/2008 | Kreamer et al. |
| 2009/0006069 A1 | 1/2009 | Alam et al. |
| 2009/0007062 A1 | 1/2009 | Gilboa |
| 2009/0012842 A1 | 1/2009 | Srinivasan et al. |
| 2009/0044170 A1 | 2/2009 | Bernardi et al. |
| 2009/0077621 A1 | 3/2009 | Lang et al. |
| 2009/0132562 A1 | 5/2009 | Mehr et al. |
| 2009/0171993 A1 | 7/2009 | Arthursson |
| 2009/0249281 A1 | 10/2009 | Fritzsche et al. |
| 2009/0278847 A1 | 11/2009 | Berg et al. |
| 2009/0319239 A1 | 12/2009 | Arnold et al. |
| 2009/0319467 A1 | 12/2009 | Berg et al. |
| 2010/0030893 A1 | 2/2010 | Berg et al. |
| 2010/0031247 A1 | 2/2010 | Arnold et al. |
| 2010/0058331 A1 | 3/2010 | Berg et al. |
| 2010/0070449 A1 | 3/2010 | Arnold et al. |
| 2010/0077328 A1 | 3/2010 | Berg et al. |
| 2010/0083212 A1 | 4/2010 | Fritzsche et al. |
| 2010/0138795 A1 | 6/2010 | Berg et al. |
| 2011/0016074 A1 | 1/2011 | Berg et al. |
| 2011/0029967 A1 | 2/2011 | Berg et al. |

OTHER PUBLICATIONS

Patel, Chirag; Office Action in U.S. Appl. No. 12/494,374, filed Apr. 19, 2011; U.S. Patent and Trademark Office; Alexandria, VA.

Patel, Chirag; Office Action in U.S. Application No. 12/494,374, filed Oct. 6, 2011; U.S. Patent and Trademark Office; Alexandria, VA.

Tecklu, Isaac; Non-Final Office Action in U.S. Appl. No. 12/181,737, filed Feb. 24, 2012; U.S. Patent and Trademark Office; Alexandria, VA.

Arnold, W., et al.; "Pattern Based SOA Deployment," Proc. of 5th Int'l. Conf. on Service-Oriented Computing (ICSOC 2007); Sep. 17-20, 2007; Lecture Notes in Computer Science (LNCS); vol. 4749; Springer 2007.

Eilam, T., et al.; "Reducing the Complexity of Application Deployment in Large Data Centers," Proc. of 9th IFIP/IEEE Int'l. Sym. on Integrated Network Management (IM 2005), pp. 221-234, May 15-19, 2005.

Corneil, D., et al.; "An Efficient Algorithm for Graph Isomorphism," Journal of the ACM, vol. 17, pp. 51-64, Jan. 1970.

Ullman, J., "An Algorithm for Subgraph Isomorphism," Journal of the ACM, vol. 23, pp. 31-42, Jan. 1976.

Gati, G., "Further Annotated Bibliography on the Isomorphism Disease," Journal of Graph Theory, 1979; pp. 96-109; vol. 3.

Messmer, B.T., "Efficient Graph Matching Algorithms," University of Bern, PhD Thesis; Switzerland, Nov. 1995.

Tsai, W. et al., "Error-correcting Isomorphisms of Attributed Relational Graphs for Pattern Analysis," IEEE Transactions on Systems, Man, and Cybernetics, vol. SMC-9, No. 12, pp. 757-768, Dec. 1979.

Patel, Chirag; Final Office Action in U.S. Appl. No. 12/494,374, filed Mar. 1, 2012; U.S. Patent and Trademark Office; Alexandria, VA.

Bharadwaj, Kalpana; Office Action in U.S. Appl. No. 12/210,139, filed Dec. 27, 2011; U.S. Patent and Trademark Office; Alexandria, VA.

Hanchak, Walter; Office Action in U.S. Appl. No. 12/504,511, filed Jan. 4, 2012; U.S. Patent and Trademark Office; Alexandria, VA.

Peiris, Mulder, Cicoria, Bahree and Paathek; Pro WCF Practical Microsoft SOA Implementation; APRESS, Berkeley, CA; 2007.

Kodali, Raghu; "What is service-oriented arthitecture?; Java World;" http://www.javaworld.com/javaworld/jw-06-2005/jw-0613-soa.html; Jun. 2006; pp. 1-5.

Parikh and Gurajada; "SOA for the Real World"; Java World; "http://www.javaworld.com/javaworld/jw-11-2006/jw-1129-soa.html"; Nov. 2006; pp. 1-3.

Erl, Thomas; "Introducing SOA Design Patterns", SOA World Magazine; vol. 8, Issue 6; Jun. 2008; pp. 2-7.

Bhargava, Anil; Office Action in U.S. Appl. No. 12/325,664, filed Mar. 25, 2011; U.S. Patent and Trademark Office; Alexandria, VA.

Bhargava, Anil; Final Office Action in U.S. Appl. No. 12/325,664, filed Aug. 26, 2011; U.S. Patent and Trademark Office; Alexandria, VA.

Yuen, Keith; Office Action in U.S. Appl. No. 12/200,720, filed Nov. 21, 2011; U.S. Patent and Trademark Office, Alexandria, VA.

Calle, Angel; Office Action in U.S. Appl. No. 12/141,655, filed Feb. 17, 2011; U.S. Patent and Trademark Office; Alexandria, VA.

Calle, Angel; Final Office Action in U.S. Appl. No. 12/141,655, filed Aug. 29, 2011; U.S. Patent and Trademark Office; Alexandria, VA.

\* cited by examiner

SIMPLIFIED DEPLOYMENT MODELING

CROSS REFERENCE TO RELATED APPLICATIONS

This application is a continuation of U.S. patent application Ser. No. 12/181,737, now U.S. Pat. No. 8,291,378, entitled Simplified Deployment Modeling, filed Jul. 29, 2008, the entire disclosure of which is incorporated by reference herein.

BACKGROUND

The present invention relates to systems, methods and computer program products that capture the characteristics of a business and physical concerns of a distributed computing environment in an extensible manner that is actionable by ad-hoc processors.

In a typical application development environment, a software architect creates software applications, e.g., using conventional development tools. However, the development environment from which a new application is developed is often different from an operations environment, e.g., a data center, which deploys the developed application. In this regard, architects within the operations environment are typically burdened with the responsibility of carrying the developed application into operations. However, the architects within the operations environment often do not have first-hand knowledge of the developed artifacts, e.g., the details, requirements specifications, configuration directives, etc., associated with the application to be deployed.

Additionally, configuration information necessary to deploy the developed application in the target operations environment is typically maintained in the form of non-integrated information, such as notes, word processing documents, spreadsheets, and other formats that lack a formal construct. This can result in difficulty for successful deployment of the application within the operations environment, especially when that entity is forced to deal with solving configuration problems that arise from incompatibilities in the requirements of the developed application and the capabilities provided by the target operations environment. For example, a failure to check a developed application against a corresponding target environment may result in an application that cannot be deployed or replicated in different solutions or locations. This may result in a requirement that the application be re-architected to accommodate the target deployment environment.

As such, incompatibility issues can arise between applications created with conventional development tools and their target deployment environment. Moreover, these problems persist throughout the lifecycle of the application and can reoccur with the movement of an application during different stages of its lifecycle, including for example, movement of the application from development to unit testing and from unit testing to integration into the production environment(s).

BRIEF SUMMARY

According to various aspects of the present invention methods are provided for implementing a deployment modeling platform. The deployment modeling platform enables a user to model application characteristics of target software and to associate application modeling parameters, e.g., checks, constraints, capabilities and/or requirements, to the modeled application characteristics. The deployment modeling platform also enables a user to model environment characteristics of a target deployment environment and to associate environment modeling parameters to the modeled deployment environment characteristics. Thus, for example, the platform enables a user to model environment modeling parameters such as resource requirements and capabilities of a deployment environment that constrain deployment of the target software so as to capture functional requirements and non-functional properties of the deployment environment.

Still further, the deployment modeling platform enables a user to create a deployment model that associates and maps selected parameters of the modeled application characteristics of the target software to associated parameters of the modeled environment characteristics of the deployment environment, e.g., to associate restrictions and requirements to the modeled resource requirements and capabilities.

The deployment modeling platform may be further utilized to verify that each parameter that relates to a requirement is mapped to and is fulfilled by an associated parameter, e.g., a capability. Thus, for example, requirement parameters of the deployment model specified for an associated one of the modeled environment characteristics and/or requirement parameters of modeled application characteristics may be mapped to, and fulfilled by corresponding capability parameters, e.g., capability parameters associated with either the deployment model specified for one of the modeled environment characteristics and/or the modeled application characteristics, to determine whether validation problems exist in order to deploy the target software in the associated deployment environment. Determined validation problems are conveyed to a user, wherein the modeled target application characteristics are checked against a corresponding modeled deployment environment.

Thus, for example the platform may create mappings between the modeled application characteristics and associated modeled resource requirements and capabilities, and verify that requirements specified for an associated model are fulfilled by matching requirements to capabilities between the modeled application characteristics and associated modeled resource requirements and capabilities to determine whether validation problems exist in order to deploy the target software in the associated deployment environment.

DETAILED DESCRIPTION

According to various aspects of the present invention, systems, methods and computer program products are provided for creating and utilizing a common tooling platform that allows a plurality of users, each implementing a different role, to work together by capturing the knowledge of each role and using the captured knowledge to communicate with the next role. In this regard, a deployment modeling platform is utilized to build extensible domain specific models that represent information technology (IT) knowledge at different levels of abstraction.

For example, the deployment modeling platform may facilitate the utilization of a formal construct that represents a real-world enterprise architecture. As such, the deployment modeling platform may be utilized to build models that capture the characteristics of the business and physical concerns of a distributed computing environment in an extensible manner that is actionable by ad-hoc processors. That is, the deployment modeling platform allows users to capture the relationships between components of the computing environment, such as relationships between business applications, the intended hardware to deploy the business applications and the server software configurations required to deploy the business applications. The deployment modeling platform may also describe the mapping between components of the computing environment.

In this regard, information pertaining to development and deployment operations may be integrated in a manner that promotes successful deployments of applications in their corresponding target deployment environments.

According to various aspects of the present invention, the deployment modeling platform can collect and distribute knowledge about new domains and their characteristics using rich semantic models. Moreover, the deployment modeling platform can capture the structure and constraints by design or discovery and apply the rich semantic knowledge across domains. Still further, the deployment modeling platform may provide intelligent validation and publishing of new and existing artifacts, e.g., in a holistic manner. In this regard, the deployment modeling platform may provide detection of structural problems, non-compliance of constraints and/or requirements and offer possible resolutions to guide a user towards a configuration of an information technology system suitable for deploying corresponding applications.

Figure 1:
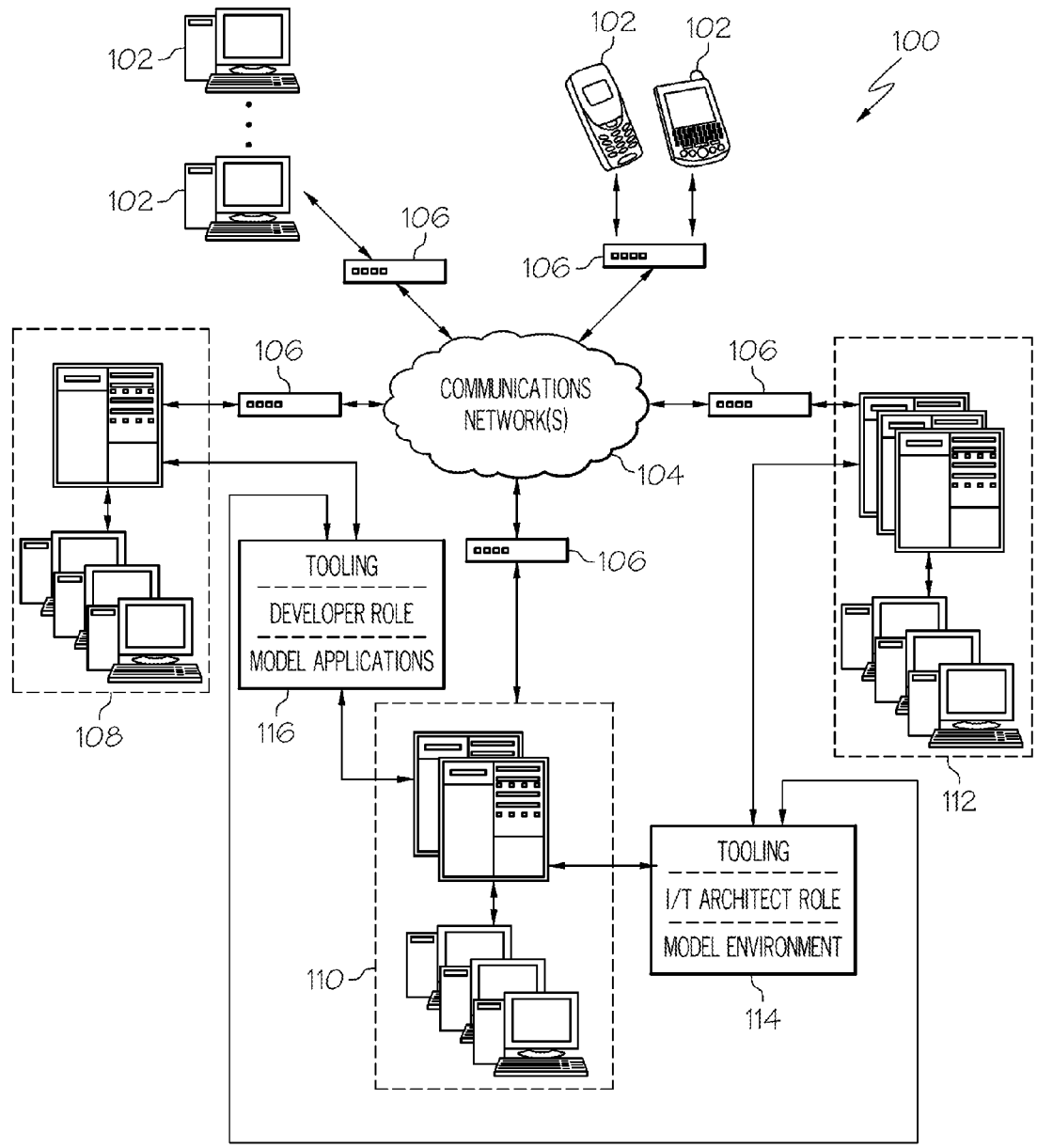
FIG. 1 is a schematic illustration of a computer system that links development, testing, deployment and end users across a network connection according to various aspects of the present invention.

Referring now to the drawings and particularly to FIG. 1, a general diagram of a distributed computing environment 100 is illustrated according to various aspects of the present invention. The computing environment 100 comprises a plurality hardware and/or software processing devices 102 that are linked together by a network 104. Typical processing devices 102 may include servers, personal computers, notebook computers, transactional systems, purpose-driven appliances, pervasive computing devices such as a personal data assistant (PDA), palm computers, cellular access processing devices, special purpose computing devices, printing and imaging devices, facsimile devices, storage devices and/or other devices capable of communicating over the network 104. The processing devices 102 may also comprise software, including applications and servers that interact with various databases, spreadsheets, structured documents, unstructured documents and/or other files containing information.

The network 104 provides communications links between the various processing devices 102, and may be supported by networking components 106 that interconnect the processing devices 102, including for example, routers, hubs, firewalls, network interfaces wired or wireless communications links and corresponding interconnections. Moreover, the network 104 may comprise connections using one or more intranets, extranets, local area networks (LAN), wide area networks (WAN), wireless networks (WIFI), the Internet, including the world wide web, and/or other arrangements for enabling communication between the processing devices 102, in either real time or otherwise, e.g., via time shifting, batch processing, etc.

In an illustrative arrangement, software developers referred to herein as software architects working within a software development environment 108 may develop a new software application and/or revise an existing software application. The developed application may comprise complex composites of multiple interdependent components that collectively implement flows of a corresponding business process. As such, before final deployment, the developed application is tested within a testing environment 110. Solutions architects working within the testing environment 110 may perform tests on the developed software and resolve issues related to configuration and implementation of the developed application. Accordingly, the server(s) and other hardware and software resources at within the testing environment should be configurable to support the application being tested.

Once the solutions architects have verified the software as functional for implementing the intended business flow, the software may be released for deployment by an operations environment 112, such as a data center. Upon deployment of the software at the data center, end users can access the hosted content from across the network 104, e.g., using a corresponding network attached processing devices 102. In this regard, the development environment 108, the testing environment 112 and/or the operations environment 116 may be entities within the same organization, or they may be independent organizations.

Reference herein to an I/T architect, a software architect and/or a solutions architect are meant to imply "user roles" of individuals interacting with the platform. In this regard, the terms are not meant to require or imply independent and individual persons or predefined separate environments, but rather the role/part/nature of assigned tasks being performed. Similarly, although illustrated as distinct, the development environment 108, the testing environment 110 and the deployment environment 112 are meant to imply "environmental roles". In this regard, the environments do not require or imply discrete separately located resources, although they may be in practice.

Although the testing environment 110, (if implemented) may be utilized to verify that the developed software is functional as intended by design for implementing the corresponding business process, problems may still persist in the successful deployment of the application. For example, each component of an application to be deployed at a data center (or testing environment) is likely to have specific hosting and dependency requirements that are functional. As such, information technology (IT) architects, solutions architects, etc., of the testing environment 110 and/or operations environment 112 must manage their hardware and/or software resources to meet these functional requirements to ensure successful deployment of the application. This can be a time consuming task, which may eventually lead to a requirement to re-architect the data center and/or application.

For example, the data center selected for deployment of the application may not have the required version of a component to deploy the developed software, e.g., the wrong version of a database server, Java Deployment modeling platform, Enterprise Edition, etc. As further examples, the operations environment 112 may not support the required software such as a required database server, operating system, etc. Still further, the operations environment may not support the physical requirements of the application, e.g., memory required by the application as architected.

According to various aspects of the present invention, integration and successful deployment of the application at the operations environment 112 is facilitated by using a deployment modeling platform that provides tooling for building extensible domain specific models that capture the relationships between business applications, deployment hardware and server software configurations, and by describing the mapping between these traditionally isolated aspects of the distributed computing environment.

In this regard, the deployment modeling platform may be utilized to enable a user to model application characteristics of target software and to associate application modeling parameters, e.g., checks, constraints, capabilities, requirements and other attributes to establish relationships between domains. The deployment modeling platform may be further utilized to enable a user to model environment characteristics of a target deployment environment and to associate environment modeling parameters, e.g., deployment environment capabilities and deployment environment requirements, to the modeled deployment environment characteristics. As an example, the environment modeling parameters may constrain deployment of the target software so as to capture at least one of functional requirements and nonfunctional properties of the deployment environment, and to associate at least one of restrictions and requirements to the modeled deployment environment.

Still further, the deployment modeling platform enables a user to create a deployment model that associates and maps selected parameters of the modeled application characteristics of the target software to associated parameters of the modeled environment characteristics of the deployment environment. In this regard, the deployment modeling platform may provide features such as a verification process to check the modeled target application characteristics against a corresponding modeled deployment environment. For example, a process may verify that each parameter of a deployment model specified for an associated one of the modeled environment characteristics and modeled application characteristics that relates to a requirement is mapped to and is fulfilled by a corresponding capability, e.g., an associated parameter of the deployment model specified for one of the modeled environment characteristics and modeled application characteristics that relates to a corresponding capability, to determine whether validation problems exist in order to deploy the target software in the associated deployment environment. Any determined validation problems may then be conveyed to a user.

As will be described in greater detail below, the tooling enables the various architects to assume appropriate roles. For example, development architects may use the tooling to interact with the platform in a developer role to model application characteristics such as the business requirements and work flows to be implemented in target software. The development architects may also interact with the tooling to associate application modeling parameters, e.g., checks, constraints, capabilities and/or requirements, to the modeled application characteristics of the target software.

I/T architects may use the tooling to interact with the platform in a IT architect role, e.g., to model environment characteristics of a target deployment environment and to associate environment modeling parameters such as resource requirements and capabilities of an operations environment to the modeled deployment environment characteristics. Environmental characteristics may be modeled, for example, by modeling the hardware availability, capabilities and requirements, software availability, capabilities and requirements, hardware and software interoperability, and other factors necessary to successfully deploy target software. In this regard, the IT architect may model the resource requirements and capabilities of a deployment environment in which the target software modeled by the developer is to be deployed and to associate restrictions and requirements to the modeled resource requirements and capabilities.

Solutions architects may utilize the tooling to interact with the platform in a solutions role, e.g., for problem resolution and integration, such as to resolve issues related to mapping between modeled application characteristics created by the software architects and modeled resource requirements and capabilities of the operations environment. For example, a solutions architect may bind the modeled applications characteristics to the associated modeled resource requirements and capabilities and resolve interoperability issues that would prevent deployment of the target software on the associated deployment environment. Depending upon the selected role, the tooling may selectively show and/or hide certain features, data, options, etc., which are not relevant to the associated role of the user. The various roles and models will be described in greater detail herein.

As an illustrative example, I/T architects may utilize first tooling 114 of a deployment modeling platform to model the target hosting and/or testing environment(s). Software architects may utilize a second tooling 116 of the deployment modeling platform to model the architecture for application components and their requirements against the model(s) of the target hosting environments. Fulfillment of developed and modeled requirements may be necessary by each target environment, such as development, testing and production to deploy the application. As such, the solutions architect binds the models created by the I/T architect and/or the software architect and resolves restrictions, requirements, etc.

The depicted exemplary computing environment is not meant to imply architectural limitations with respect to the present invention. Moreover, the above configuration is shown by way of illustration and not by way of limitation. As such, other processing system configurations may be implemented.

Figure 2:
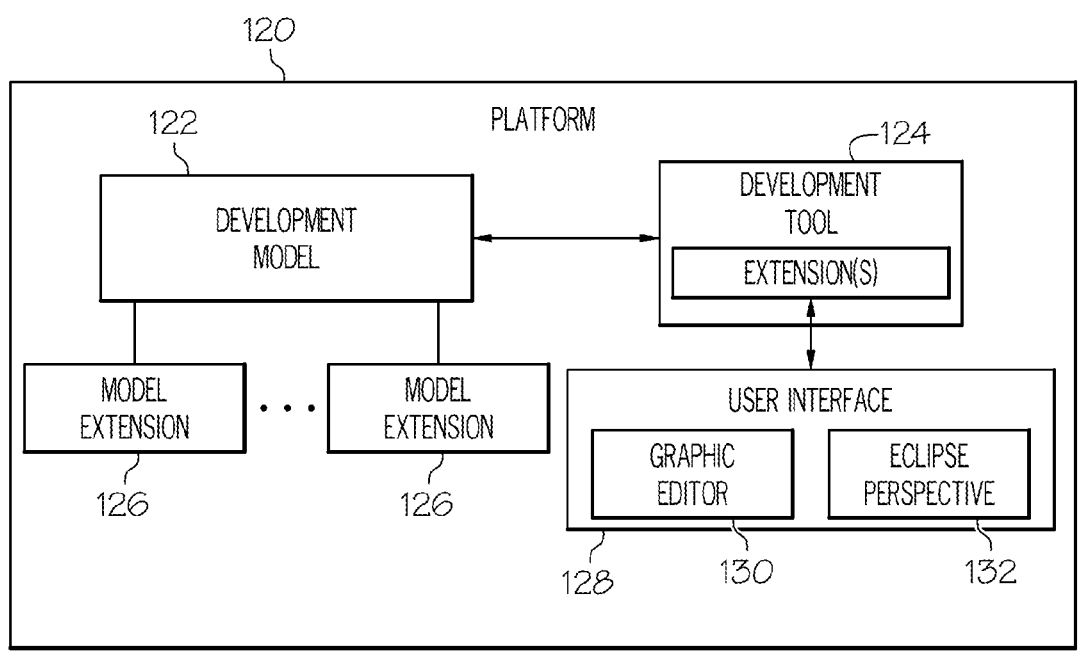
FIG. 2 is a block diagram of an extension deployment modeling platform according to various aspects of the present invention.

Referring to FIG. 2, a deployment modeling platform 120 comprises a development model 122 and a development tool 124 that provide an extensible deployment framework. According to various aspects of the present invention, the deployment modeling platform 120 allows the implementation of a formal construct that defines simple concepts that capture requirements, capabilities and their relationships, e.g., business and physical requirements, capabilities and their relationships for an enterprise architecture. The fundamental concepts of the development model 122 may thus be simplified such that there are no complex types with complex relationships that require tools and other consumers to fully understand all of the types and their relationships. Rather, the development model 122 comprises a "Unit model" framework that defines a core definition that can be used as a foundation to build specific instances of domain representations into corresponding models as will be described in greater detail herein. The formal construct provides a common language and allows the construction of an extensible type system. In this regard, "extensions" to the formal construct may be utilized to represent specific aspects of distributed computing environments that the core deployment modeling platform was not initially aware of. Examples of extensions are also described in greater detail herein.

Moreover, according to various aspects of the present invention, the deployment modeling platform 120 provides modeling, structure and governance of design, development, requirements and other parameters necessary to comprehend solutions to integration problems. Thus for example, the development model 122 may be implemented so as to define simple concepts that capture the structural capabilities and requirements of elements in an information technology system, such as application components, middleware software, hardware, networking and/or other business and physical requirements, capabilities and their relationships for an Enterprise Architecture.

In an exemplary implementation, the deployment modeling platform 120 may operate on the fundamental concepts presented in the Topology Definition Model (TDM). As such, the TDM may serve as the formal construct underpinning the deployment modeling platform 120. However, other models may alternatively be implemented so long as a core set of modeling concepts can be operated upon in a repeatable and reliable fashion, e.g., by understanding the core structures and their relationships.

The deployment modeling platform 120 defines an extension model framework that provides several "model extensions" 126. The model extensions 126 extend the development model 122, such as to further refine instances of the unit model for specific domain representations, by adding and/or refining domains to the model, etc. Other extensions may be subsequently implemented to bridge the gap from environments that contain content to be deployed or already deployed but that is described in other model(s) or format(s). This allows for content from other models and formats to be integrated into an instance of the development model 122. Thus, extensions to the development tool 124 may perform capabilities such as custom validation, publishing and/or exporting of new and existing artifacts in a holistic manner.

According to various aspects of the present invention, the development model 122 exposes a set of "extension points" for customizing the deployment modeling experience via the model extensions 126 based on different domains and/or contexts. According to various aspects of the present invention, the model extensions 126 may be implemented using existing technology, such as the Eclipse extension point mechanism or any other suitable extension point mechanism. For example, "extension points" as used herein, are a concept specific to Eclipse-based applications. Using a declarative extension mechanism that allows software contributions to be linked in following well defined contracts and patterns of behavior, points of extensibility are defined which allow third party contributors to act on the model seamlessly within the tooling environment without the tool vendor being aware of their contributions.

The exposure of the extension points allows the development tool 124 to create relationships that can be validated based on requirement and capability matching within the development model 122. This frees the deployment modeling platform 120 from completely understanding the domains (i.e., model extensions) used in the deployment modeling platform model 122 and their relationships with other domains. However, the exposure of extension points is not strictly limited to validation. For example, the extension points may be used for publishing, exporting, palette configuration, leveraging an extensible type system, etc., as will be described in greater detail herein.

Thus, the core concepts of the development model 122 may be extended to provide a rich formal construct for virtually any domain type in a manner that frees the deployment modeling platform 120 from requiring complete knowledge of all possible domains (i.e., model extensions) used in the development model 122 and their relationships with other domains. Still further, extensions may extend the development tool 124 to enhance an understanding of information modeled by the deployment modeling platform 120.

According to aspects of the present invention, the deployment modeling platform 120 may also include a graphical user interface 128. For example, the user interface 128 may comprise an editor that is utilized to create composite application models that may comprise any number or combination of application models, environment models, deployment models and/or other models that describe domains of interest. As an example, a user may interact with the user interface 128 to manipulate instances of the common core model for specific domains to create a desired model. As will be described in greater detail herein, the development tool 124 may further implement an extension model framework that allows users, e.g., via the graphical user interface 128, to define extensions to an instance of a core unit. The extensions represent different semantics and attributes corresponding to specific aspects of modeled domain representations. Similarly, extension points may be utilized to integrate the development tool 124 with the underlying model, including its extensions.

Thus, the same model framework may be used as a starting point to create, for example, logical pattern models, physical domain specific (but richness neutral) models and physical existing infrastructure models. The model framework may also be used to create "yet to be created" models. That is, a user may model a hypothetical infrastructure, application, or any domain of interest, which has not been directly discovered. The user can design the hypothetical, decide what it would look like, describe it and then change it within a graphical environment. Moreover, the modeling platform 120 may adapt to new requirements and capabilities in such as way as to provide ongoing support. Alternatively, models may be imported from other applications.

As an example, the graphical user interface 128 may comprise an extendible graphical editor 130 for visualizing models and may be used to implement views for operators implementing various roles, e.g., the first tooling 114 and second tooling 116 described with reference to FIG. 1. Thus, for example, a user implementing a first role, such as that of an applications architect, may create a specification model. A user implementing a second role, such as an I/T architect can drag and drop the specification model, possibly in another instance of the graphical editor, to conform the specification model to a host link. The user interface 128 may also include a perspective 132 for organizing related views, such as navigators, resource explorers, problem views, and property views.

As noted above, the deployment modeling platform 120 may operate on the fundamental concepts presented in the TDM model. For example, the deployment modeling platform 120 may further be utilized to leverage many domain extensions that have been defined as part of a core delivery to create topologies that represent a deployment of applications into an infrastructure. Moreover, custom extensions may be utilized or created to make the development tool 124 aware of other resources and capabilities, such as Configuration Management Databases (CMDB), e.g., to translate to and from the CMDB and TDM instances. TDM also has extensions that allow the publishing of a topology, e.g., using a provisioning manager.

Figure 3:
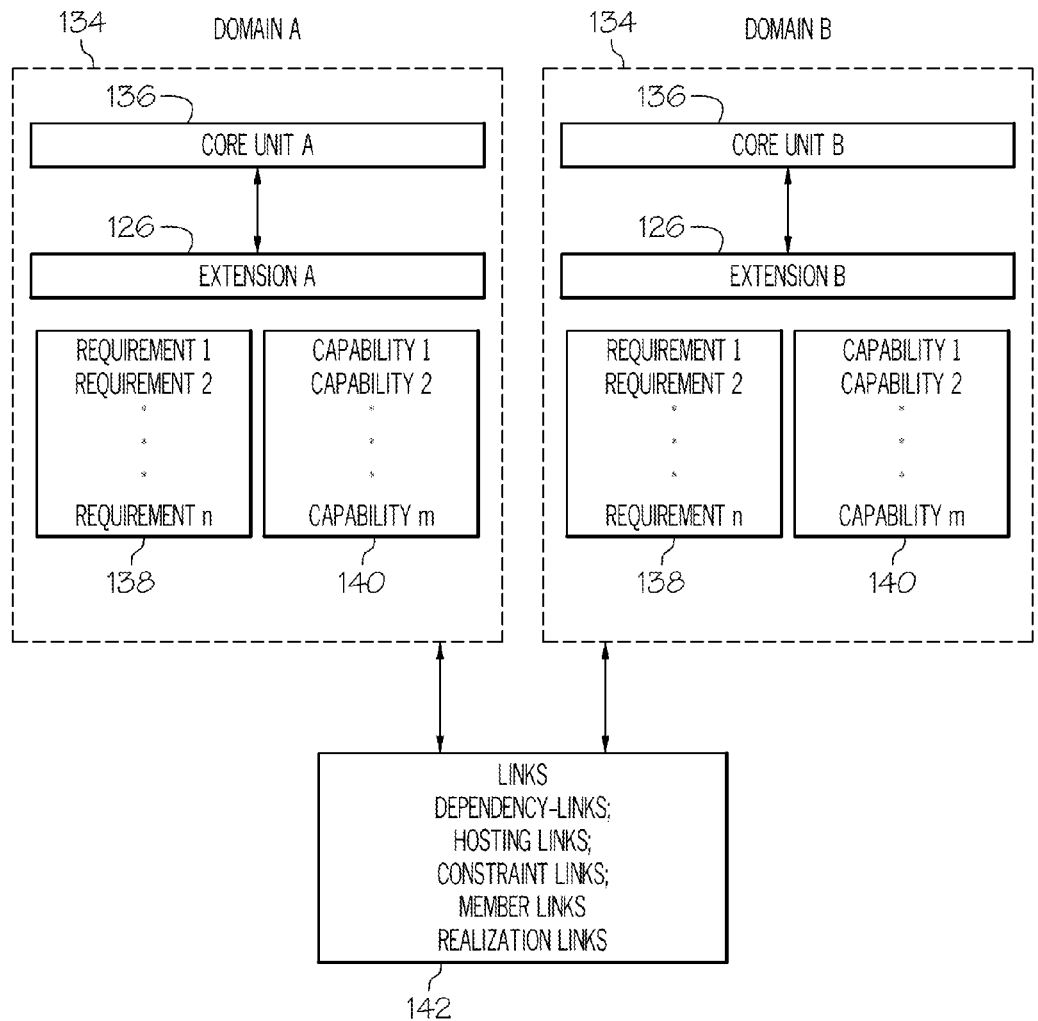
FIG. 3 is a block diagram of Unit components according to various aspects of the present invention.

Referring to FIG. 3, the development model 122 may utilize a component referred to herein as a "Unit" (or "unit model") 134. The unit 134 comprises a core unit 136. The deployment modeling platform 120 also allows extending of the core Unit 136, e.g., using the model extensions 126 to contribute specialized behavior support to introduce other domains into the development model 122. This enhances the ability of the development tool 126 to build more elaborate models. For example, exemplary domains such as Java 2 Enterprise Edition (J2EE) from Sun Microsystems, Inc. of Mountain View Calif., Database 2 (DB2) distributed by International Business Machines of Armonk, N.Y., and WebSphere, also by International Business Machines of Armonk, N.Y., may provide statically defined Units that have different semantics and attributes/properties defined on the domain.

Each Unit 134 may also comprise one or more modeling parameters, such as "Requirements" 138 and/or one or more "Capabilities" 140. The model is build upon the fundamental concept that the collection of Requirements 138 of a corresponding Unit 134 must be fulfilled in order to deploy that Unit 134. According to various aspects of the present invention, the Requirements 138 may comprise "required" requirements and "optional" requirements. Under this (or a similar arrangement) only the "required" requirements must be fulfilled as actual requirements in order to deploy the unit. Optional "requirements" are correspondingly considered "optional parameters" and are not treated as actual requirements for purposes of verifying whether validation problems exist in order to deploy the target software in the associated deployment environment.

A Requirement 138 is fulfilled by matching that Requirement 138 against one or more Capabilities 140 of other Units 134 using various "links" 142. Exemplary links may comprise Dependency Links, Hosting Links, Constraint Links and Member Links In this regard, other "link" functions may additionally/alternatively be implemented. Thus, as noted above, relationships may be created that can be validated based on requirement and capability matching within the model.

Thus, as an illustrative example, the deployment modeling platform may be expressed as several units, where each unit consumes services to provide capabilities. As yet another illustrative example, a data center may register information in a model that defines the requirements and capabilities of the data center to host certain applications. However, structures and physical and logical organizations are not constrained to a single domain.

According to various aspects of the present invention, the shared modeling structure and a platform that operates on this model allow the platform and model to be extended in a dynamic manner to manipulate and reason about disconnected technology domains. This allows users with different roles in different groups in the organization to work with aspects of the model that are specific to their technology area. Solution architects can work with domains that span multiple technologies and resources from both software and operations teams. Thus, as an example, notes, emails, and spreadsheets are not required for transferring information between typically disconnected domains. Rather, information is conveyed across various domains via the models and associated links. This allows, for example, information to be shared between development and deployment operations, as well as for applications to be developed in a manner that is checked against its target deployment environment, reducing the likelihood that the application will need to be re-architected.

Figure 4:
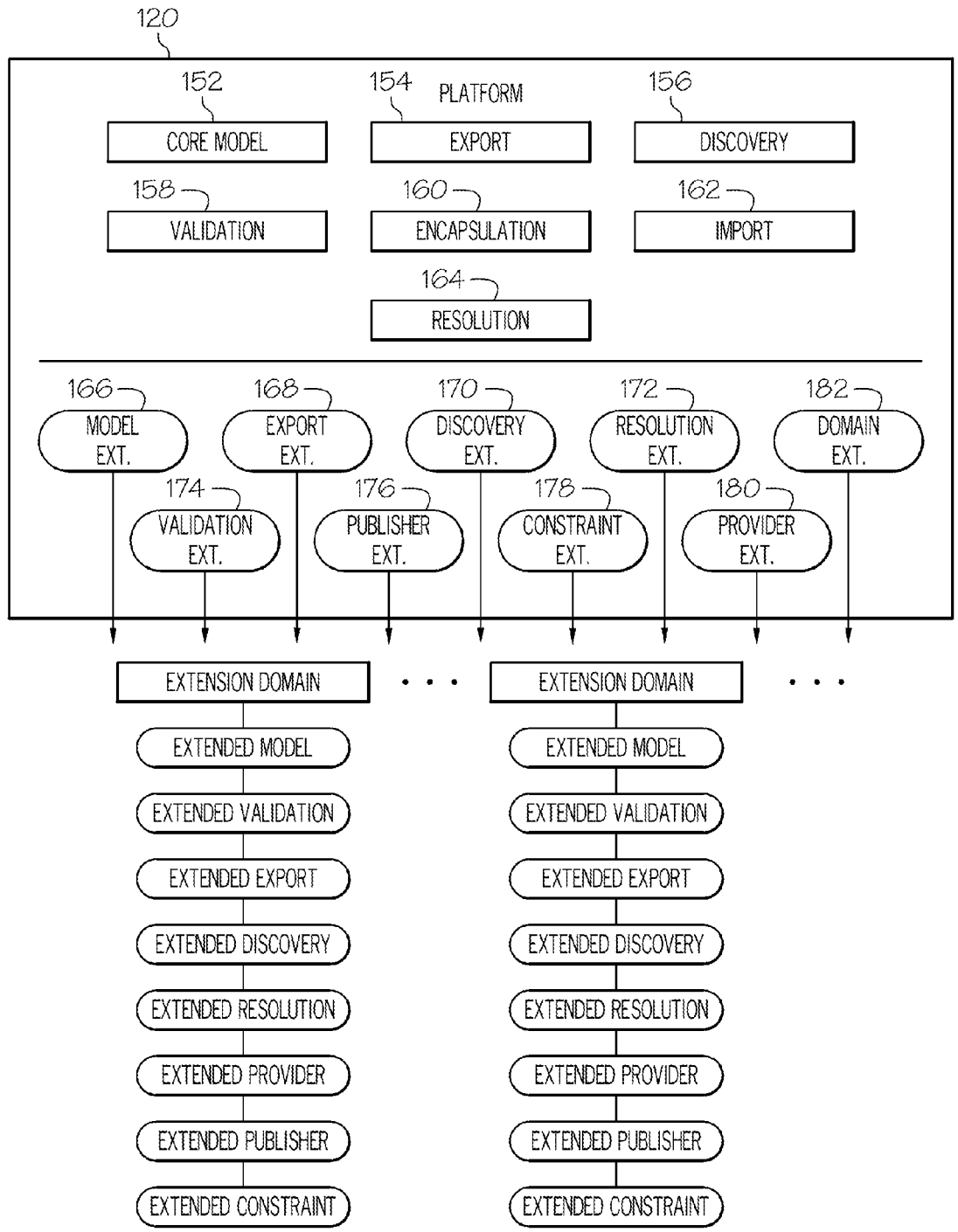
FIG. 4 is a block diagram of features and extensions of the deployment modeling platform of FIG. 2 according to various aspects of the present invention.

Referring to FIG. 4, another schematic view of the deployment modeling platform 120 illustrates the model extension framework in greater detail. The illustrated deployment modeling platform 120 includes a core model 152, which provides the core unit structure that can be extended by the domains in which various aspects of the present invention are to be utilized. In this regard, the core model 152 may be analogous to the unit 134 described with reference to FIG. 3. The deployment modeling platform 120 may also include a plurality of features, e.g., that form extensions of the development tool 124 that enhance and facilitate the application of the core model to the domains of interest.

For example, the illustrated deployment modeling platform 120 includes an Export extension 154, which may interact with the user interface 128 to allow a user to select a Domain/unit for exporting in a desired format desired. The export extension 154 may be useful, for example, where a user desires to export a model for publishing using an independent application, such as by using Tivoli Provisioning Manager by International Business Machines of Armonk N.Y., USA.

The deployment modeling platform 120 may also include a Discovery extension 156 that interacts, for example, with the user interface 128 to allow a user to configure discovery mechanisms for automatically locating and/or resolving requirement matches during validation operations. For example, the extension points may include a top level model discoverer extension point that will serve as the selection mechanism with the development tool 124.

A Validation extension 158 may also be provided that interacts with the user interface 128, e.g., to allow a user to customize validation parameters to be utilized for validation operations. According to aspects of the present invention, the modeling component can be coupled with validation component to validate functional, e.g., propagation of attributes, check that requirements are met, etc. as well as nonfunctional aspects. Examples of non-functional aspects may include inquiries as to whether a particular configuration can give the desired visibility at what level, such as the system level, data center level, etc. When errors are found through validation (extensible knowledge that people contribute) solutions may be registered. Thus, given a problem, a user may figure out how to resolve it. This knowledge is leveraged so that the user does not have to perform all of the actions manually on the model.

Moreover, models that have been validated as correct, complete and actionable may be used to drive automated deployment and configuration. For example, because the model is concrete and actionable, the export extension 154 may be utilized to publish information used to generate workflow and create script(s) that an operator can run or schedule to deploy the associated application.

An Encapsulation extension 160 may be provided, e.g., that interacts with the user interface 128 to allow a user to set parameters for encapsulation of architecture elements. An Import extension 162 may be provided that interacts with the user interface 128 to allow a user to set parameters and links for the contents from an imported model into another model as part of the deployment modeling platform. As yet another illustrative example, a Resolution extension 164 may be provided that interacts with the user interface 128 to allow a user to set parameters for registering generators that produce resolution options to validation problems. In practice, the deployment modeling platform 120 may include other or alternative extensions.

As illustrated, the deployment modeling platform 120 further allows for a plurality of extensions to the core model 152, e.g., to contribute specialized behavior support. These extensions correspond to the extensions described with reference to FIG. 2. For example, as illustrated, the deployment modeling platform 120 includes a Model extension 166, which may also be referred to herein as a unit provider extension. The model extension 166 may provide, for example, an extension point that allows extenders to translate and synchronize objects in their environment to and from Unit instances in the development model 122. For example, there may be a unit provider with Rational Application Developer tools that can create a Unit definition for a J2EE Web Application project. Enablement expressions, e.g., from Eclipse may be used to determine when a unit provider extension is available for a selected object in the environment.

The deployment modeling platform 120 may further comprise an Export extension 168. The Export extension 168 provides extenders of the deployment modeling platform 120 to define how an instance is exported. For example, the export framework may provide normalization and validation support. The export extension may also be utilized to export content to an archive. As another example, the exportation of a model may comprise transforming the content to a series of custom installation scripts. A publisher extension may further leverage the exporter framework to export content prior to publishing.

The deployment modeling platform 120 may still further comprise a Discovery extension 170. The Discovery extension 170 provides an extension point that allows for the registration of automatic discovery mechanisms for resolving requirement matches. The type of discoverer registered can achieve the matching of requirements in any fashion it wishes. Moreover, an additional unit discoverer extension point may be implemented that is used in conjunction with the discovery mechanisms that allows for the discovery of a unit which is not defined in the current instance. Thus, matches for requirements can be located within an environment not modeled directly by the tool, e.g., infrastructure.

The deployment modeling platform 120 may further still comprise a Resolution extension 172. The Resolution extension 172 defines an extension point that provides extenders with the ability to register generators that produce resolution options to validation problems. For example, the deployment modeling platform 120 may convey to the user, e.g., via the graphical user interface 130, resolution options to detected validation problems based on the resolution options produced by the registered resolution generators. In an illustrative example, Resolution Generators may be called for a given status which defines the validation problem based on a set of Eclipse enablement expressions. The deployment modeling platform 120 may still further comprise a Validation extension 174. The Validation extension 174 provides a way for extenders to have an ability to provide validation for a given set of unit and capability types.

As another illustrative example, the deployment modeling platform 120 may comprise a Publisher extension 176. The Publisher extension 176 provides an extension point that allows extenders of the deployment modeling platform 120 to define how an instance of a model is published. However, the semantics around publishing may be completely left to the extender. The publishing framework may further provide support for normalizing the model to make it much more consumable to publishers. The Publisher extension 176 may also provide a validation mechanism for publishers to provide additional validation logic prior to publishing.

As yet another illustrative example, the deployment modeling platform 120 may comprise a Constraint extension 178. The Constraint extension 178 provides an extension point that allows for extending the core deployment modeling platform 120 such that different constraints can be provided to operate on the types provided in the development model 122. Some examples of these constraints include co-location or anti-colocation of the hosting of the units such that the hosting stack can be validated for this constraint. As used herein, the term "collocation" should be interpreted expansively to mean in general, moving or placing things together at some definable layer of abstraction, e.g., in a target environment. For example, hosting of the units may be on the same device, system, premises, etc. Correspondingly, the term "anti-colocation" or phrase "not collocated" should be interpreted to mean that things are not placed together on some definable layer of abstraction, e.g., where software, hardware and/or equipment are located remote from a target deployment environment.

The deployment modeling platform 120 may further comprise a Provider extension 180, also referred to herein as a capability provider extension. The Provider extension 180 provides an extension point that is similar to the Provider extension except that it is a finer grain provider that can create instances of Capabilities and Requirements based on selection in the environment. For example, the created capabilities and requirements may be added to the created Unit from the enabled Provider. This provides a greater flexibility for extenders that want to add capabilities or requirements only in certain situations but they need to be added across many Unit types.

The Platform itself is a core domain and provides a base set of validation. It also allows other extension domains to be contributors as a combination of the model extension and the other types of extensions like for validation, publishing etc.

As noted in greater detail herein, the deployment modeling platform 120 may further allow for extensible "validators" to evaluate the captured relationships, e.g., capabilities and requirements of the modeled aspects of the distributed computing environment. For example, a validator may understand the formal constructs of a cross-domain real world Enterprise Architecture to enforce early detection of problems and provide for possible resolutions, such as by conveying validation errors to a user. Such a validator may also allow for ad hoc processors that operate on the formal construct to effect a change, analysis, or simulation of the distributed computing environment with clients having an ability to change the environment.

Due to the dynamic and constantly changing nature of business activity and correspondingly, due to the dynamic nature of computing hardware and software, it is possible that the deployment modeling platform 120 as originally implemented, e.g., the core deployment modeling platform 120, is not aware of new characteristics or environments. According to various aspects of the present invention, the deployment modeling platform 120 thus enables extensions to the formal construct that represent specific aspects of the distributed computing environment 100 that the core deployment modeling platform 120 was not initially aware.

Thus, analysis may be controlled with domain validators and constraint validators for constraints defined in a model. For example, performing communication analysis or capacity analysis is done via knowing the structural relationships as well as the constraints defined on units.

Other exemplary extensions may additionally/alternatively be implemented. For example, a Domain extension 182 may provide an extension point that allows extenders to define new domains within the development tool 124. Defining a new domain may also mean that a new set of extensions for the development model 122 may be defined. However, such is not required by the various aspects of the present invention. A new domain may be defined which simply extends the validation or requirement interpretation support.

A primary element of a domain extension may be a validator. The validator element provides a way for extenders to have an ability to provide additional validation beyond the core validation of a framework for a given set of unit and capability types (typically defined by the domain but not required).

Another element in the domain extension may be a "template". A template may comprise, for example, a pre-configured domain representation, e.g., a pre-configured instance of a Unit type that is used as a framework or partial framework for creating new instances. A domain can define zero or more templates. A template can define specifics about a particular Unit type that an extender may want to reuse over and over again. These templates are typically added to the palette of the graphic editor 130 provided by the deployment modeling platform 120. The domain extension point may also comprise an interpreter element that allows extenders to define new interpreters to be used to evaluate constraints. The core deployment modeling platform 120 may define basic interpreters but custom interpreters may be required based on the needs of the domain owner.

In use, the core services that are required in the lifecycle of the deployment modeling may be defined with an ability to be extended by the extension domains. According to various aspects of the present invention, the identification of these services and extensions, e.g., as incorporated into the deployment modeling platform 120 may be leveraged to formulate a simplification of the deployment modeling in an extensible and actionable manner.

According to various aspects of the present invention, models capture information for each stage in the development lifecycle. Role-based tooling and automation assist transition between each stage of the cycle.

Figure 5:
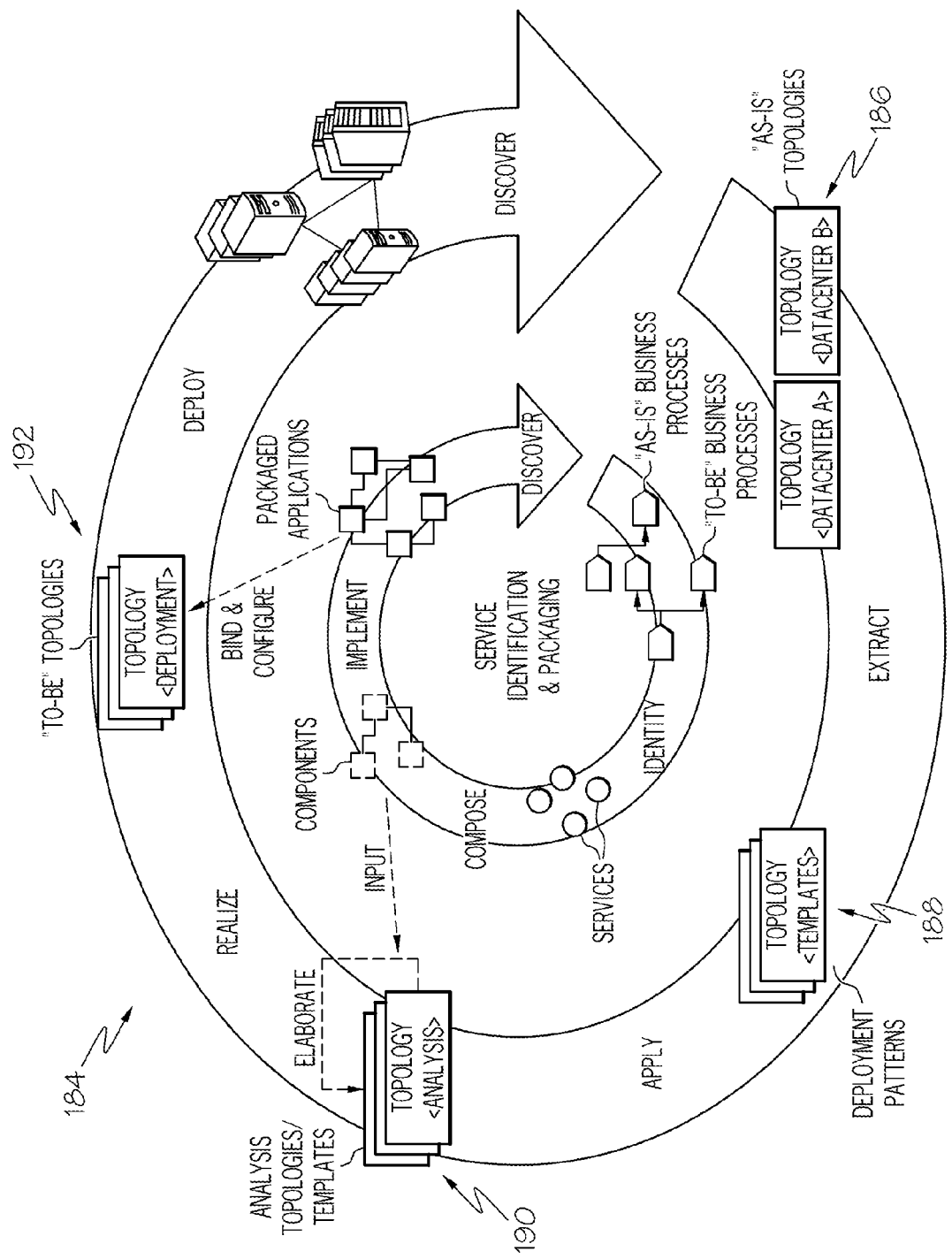
FIG. 5 is a schematic illustration of a topology lifecycle according to various aspects of the present invention.

Referring to FIG. 5, a flow diagram of a "topology lifecycle" 184 is illustrated according to various aspects of the present invention. As shown, there are essentially two loops. The inner loop illustrates an exemplary service identification and packaging lifecycle that is outside the tooling but is tied to the platform by providing input modeling, as will be described in greater detail here. The outer loop illustrates a deployment lifecycle within the tooling that tracks the service development lifecycle of the corresponding inner loop. Design business processes comprise existing or planned processes, e.g., processes that are extracted as services which are implemented as components and are then packaged. The different phases of service deployment are inputs to the deployment.

According to various aspects of the present invention, users may start anywhere in the cycle. However, for sake of discussion, a convenient place to initiate a description of various aspects of the present invention is at a discovery stage that is utilized at 186 to identify and discover existing resources of a data center. In this regard, the data center has existing resources. An I/T architect selects subsets of the discovered information and brings that information into a model container referred to herein as a "Topology".

As used herein, a "topology" is a model that presents a way to describe and categorize modeling parameters, e.g., requirements, capabilities, relationships, and interdependencies that capture the characteristics of the business and/or physical concerns of a distributed computing environment. Thus, the Topology may be used to describe aspects of knowledge within a domain. For example, a topology may model application characteristics by containing information about a specific instance of application characteristics, resource requirements and capabilities, etc., and may be specific to the particular implementation of the platform. In a similar manner, topologies may model deployment characteristics or other domain characteristics of interest. In this regard, topologies may also be tied to data that corresponds the topology to a particular instance. Keeping with the exemplary implementations described with reference to FIGS. 1-4, a topology may be conceptualized as a container for "Units" which are already deployed or are in the process of being deployed.

According to various aspects of the present invention, a topology model may be implemented as an organizational view that can be conceptualized in a hierarchy/tree view that places a logical analysis at the top of the conceptual hierarchy. The logical analysis utilizes a repeated process of elaboration to define an analysis topology that deals with component placement. An intermediate layer in the hierarchy/tree view corresponds to a physical analysis, e.g., technical specifications where analysis topologies are realized that include structural components such as a testing environment, production environment, etc. The bottom of the hierarchy/tree view comprises deployment instances, e.g., environmental bindings utilizing deployment topologies.

A template may be a topology that does not include the details of a particular instance. However, the constraints, requirements and capabilities are kept. For example, a user may pull up a topology and strip out all of the instance statements and information, e.g., data specific to a given data center. Templates may also be stored back out in one or more folders. A template may thus be conceptualized as an extracted pattern and its requirements.

Thus, a user can create a new topology by starting with a template topology and by plugging in instance level information into the template. The new topology may be saved back out to a folder or other organization to be shared with other users. In this regard, templates and topologies are conceptually like stamps in that they represent relationships and characterizations. A user can combine, commingle, import extract or otherwise manipulate one or more existing topologies and topology templates to create one or more additional topologies and/or templates.

As an illustrative example, an I/T architect creates reusable cross-domain template models that constrain deployment so as to capture functional requirements and nonfunctional properties of an associated environment. For example, the I/T architect may create one or more "as-is" topologies that define the current state of computing capabilities, requirements, etc., of a corresponding operations environment, testing environment, etc. Through an extraction process, the I/T architect extracts information, e.g., deployment patterns, from the "as-is" topologies to create "I/T Templates" at 188, which are representative of the target environments that serve as input into a solution design. In this regard, the I/T templates may be thought of as a specification or contract of the current "as-is" topologies created at 186 that are supported by the current environment(s). Moreover, the I/T templates can serve as a starting point for the software architect as will be described in greater detail below.

The "contract" as used herein, allows a topology to be able to encapsulate it's contents with certain attributes like public, private or public editable. Once a contract is specified for a topology it's then applied when the topology is imported in another topology. At the specific import instance, the import definition may also be configured by allowing the public editable properties to be edited. This allows for the same topology to be imported in different contexts wherein different configurations may be applied based on that import's context.

As noted in greater detail herein, the topologies may be placed in folders. Users with access to the folders can look at the details of the topology on a desktop, e.g., using the graphical user interface 128.

Through an application process, the software architect captures the deployment requirements, e.g., their applications for their service components, and associates them with one or more IT templates at 190. That is, the software architect may use the previously created I/T templates to serve as the hosting target of application components that are intended to be deployed. The software architect does not need actual physical components at this point. Rather, such details may be resolved at a subsequent stage. Thus, the software architect may define a high level deployment role, for example, a need for a highly available J2E cluster and highly available database. However, the software architect may defer the selection of specific resources. As an example, an architect may not have actually selected, for example, the fact that Websphere is a desired resource.

The software architect and/or solutions architect may also create another set of topologies or topology templates referred to herein as application templates at 190 that attempt as best as possible to capture the capabilities and requirements of the application components between on another and between the application components and the target deployment environment(s) described in the utilized I/T templates. The software architect identifies those requirements that cannot be fulfilled so that a solutions architect can fulfill those requirements at a later time.

As an illustrative example, a domain expert may identify an observation that there are many types of Websphere. As such, application topologies or templates are created that define requirements, interdependencies, etc. for each version of Websphere. In this regard, the topologies can be contributed by the manufacturer or created by in house domain experts.

Thus, a user such as a software architect can grab and drag a Websphere Version 4 template or other suitably created template onto their workspace and now has access to all requirements and capabilities of Websphere version 4 without having to possess that domain knowledge directly. Moreover, the software architect can create more topologies and/or templates and save them to the tooling for others to use.

Thus, in this illustrative example, topologies and the tooling platform may be utilized, e.g., by a software architect to create an application constrained to a data center that is to deploy the application.

As further illustrated, "to-be" business processes are implemented by software services. These services and components serve as inputs that can be considered by the software architect in establishing the application topologies. The software architect may further elaborate as necessary to derive the appropriate topologies.

Topologies are passed in a deployment phase at 192 to a solutions architect that selects specific resources, e.g., a particular server, a particular Websphere application server, etc. The solution architect assembles several application services into a solution adding more details as necessary. The solution can then be connected (realized) to one or more of the previously created "as-is" topologies, thus defining deployment configurations. In this case all requirements must still be met. The solutions architect binds the applications templates created by the software architect to an existing "as-is" topology and resolves any unresolved issues left by the software architect. For example, the solutions architect may need to install a particular operating system, database, Websphere server, etc., if no existing structures satisfy the model requirements.

Once all of the visible requirements are fulfilled and constraints are met, the solutions architect has produced a fully resolved "to-be" topology (model) that represents the desired state of the data center after publication. As seen in the inner circle, the developed software components are packaged as an application that is used to bind deployment topologies created from the "as-is" topologies and applications topologies. The deployment topologies may thus be utilized to bind and configure the associated data center for deployment of the developed application.

In the illustrative example, relationships are captured in such a way that preserves a separation between topologies. Thus, for example, the essence of a business or physical architecture may be organized independently of specific configurations of the distributed computing environment. Accordingly, a business application topology can be re-used with several different infrastructure topologies, and an infrastructure topology can be re-used across many business application topologies.

Figure 6:
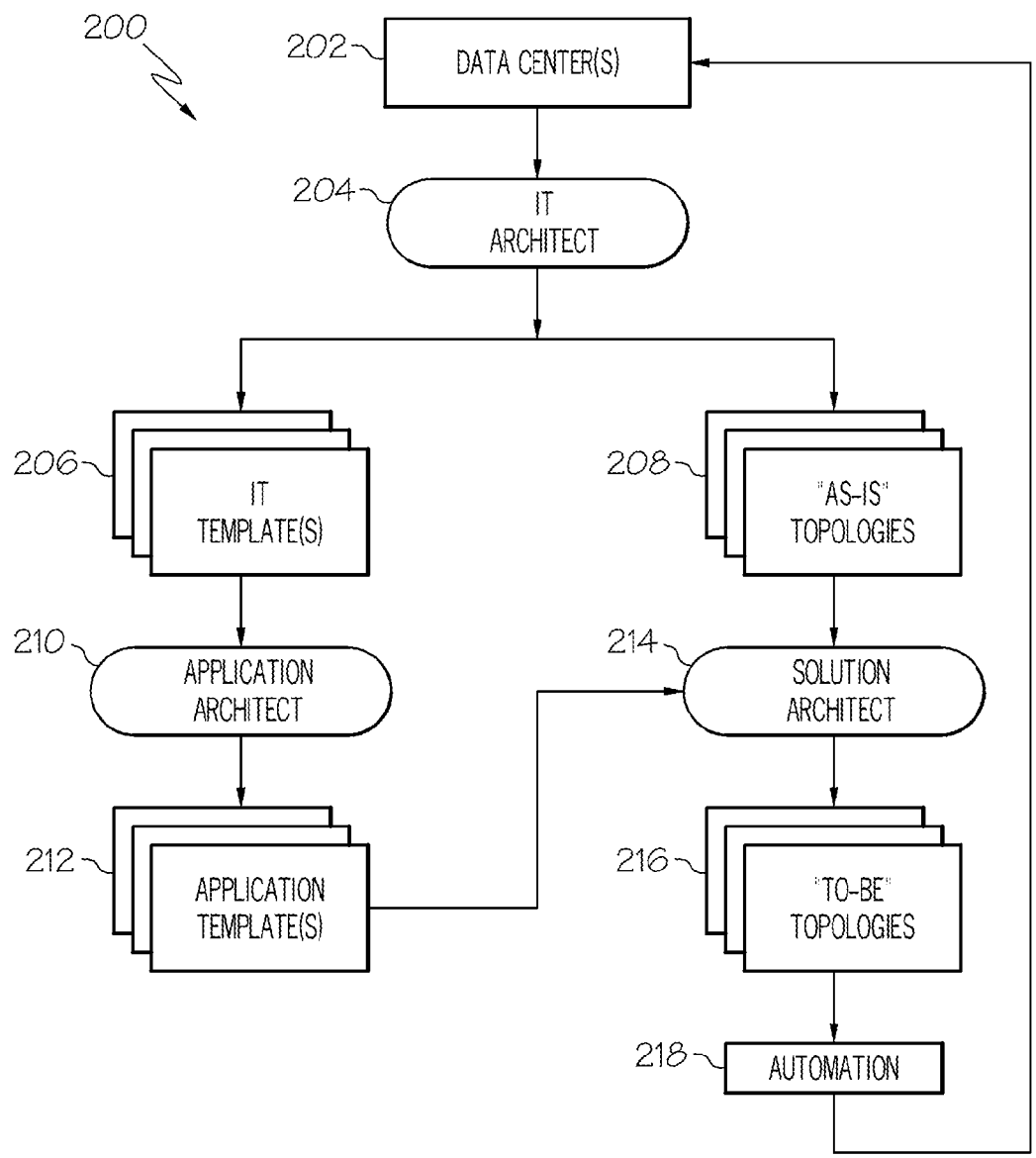
FIG. 6 is a flow chart illustration of a topology lifecycle according to various aspects of the present invention.

Referring to FIG. 6, an exemplary system 200 is schematically illustrated for leveraging the capability of the deployment modeling platform 120 to bridge the gap between development and deployment of software applications, e.g., based upon the cycle flows of FIG. 5. As illustrated, a data center 202 is capable of deploying software within the limits and capabilities of the resources, e.g., hardware and software server configurations available to the data center 202. In this regard, an IT architect 204 having domain knowledge of the data center utilizes the deployment modeling platform 120, e.g., the graphic editor 130 in cooperation with the Domain extension 182 to create one or more IT templates 206. The IT templates 206 may be scalable, secure and made highly available, e.g., to other users across the distributed computing environment, such as software architects of the development entity.

As noted more fully herein, the templates may be implemented as an element of the domain model extension 182. In this regard, the IT templates 206 may comprise, for example, pre-configured instances of a Unit type that are used for creating new instances of domain representations. The IT Architect 204 may also utilize the domain model 182 to create "As-Is" Topologies 208. The "As-Is" Topologies 208 collectively may be utilized, e.g., by the IT architect 204 to define the physical and/or logical schematic description or arrangement of the data center 202. For example, the As-Is Topologies 208 may define current production topologies in use, define integration testing topologies and/or provide other relevant information.

A Software architect 210 utilizes one or more of the IT templates 206 to check software development against requirements and capabilities of the Data center 202. The Software architect 210 may similarly create one or more applications templates 212. In a manner analogous to that described above, the Software architect 210 may utilize the deployment modeling platform 120, e.g., the graphic editor 130 and domain extension 182 to create one or more Application Templates 212, which may themselves be scalable, secure and made highly available, e.g., to Solutions architects 214 for the development of solutions for deploying the developed software at the data center 202.

The Solutions Architect 214 may utilize the "As-Is" topologies 208 created by the IT architect 204 and/or the applications templates 214 created by the software architect 210 that define characteristics of the developed application to verify the likelihood of successful deployment of the software on the resources provided by the data center 202, and/or to resolve issues with compatibility. The Solution Architect may also define fully resolved "To-Be" topologies that define the physical and/or logical schematic description of the arrangement of the data center 202 in deploying the developed software.

As noted in greater detail herein, the deployment modeling platform 120 thus provides for the separation of concerns, such as to capture the essence of, e.g., a characterization of, a business or physical architecture independent of specific configurations of the distributed computing environment. With this separation, business application topologies can be re-used with several different infrastructure topologies, and an infrastructure topology can be re-used across many business application topologies. Thus for example, with reference back to FIG. 1, the result allows the essence of a business application to be captured and deployed onto the test infrastructure configuration, such as may be utilized by the testing environment 112, and then the same business application topology can be re-used for the production environment, e.g., by the operations environment 116 for deployment of the developed application.

With reference back to FIG. 6, as an illustrative example, the IT Architect 204 may create one or more Templates that define data center capabilities and requirements. The IT Architect 204 may also define one or more topologies that model the data center 202. The corresponding Software architect 210 may pull the topology, models and other relevant information from the deployment modeling platform 120. As such, the application is developed that only uses components that are compatible with the data center 202. Thus, at the time of application development, an Software architect 210 that attempts to select, for example, a client driver that does not satisfy server requirements at the data center 202, e.g., based upon corresponding resolution and validation extensions 172, 174 can be identified and a solution may be comprehended because the deployment modeling platform 120 understands both the application requirements and capabilities and the deployment operations requirements and capabilities. As such, the deployment modeling platform 120 provides environmental tooling that provides checks and bounds to make sure developed applications will be deployable in a corresponding data center.

Although an example of a client driver was provided for purposes of illustration, the various aspects of the invention are not limited to client drivers. Rather, an entire Enterprise Application including components that deploy to various types of middleware and database definitions/requirements can be identified and solutions to integration, interoperability, etc., may be comprehended e.g., based upon corresponding resolution and validation extensions 172, 174 because the deployment modeling platform 120 understands both the application requirements and capabilities and the deployment operations requirements and capabilities.

The above solution comprehending capability of the deployment modeling platform 120 may be available, even where the violated requirement is nonfunctional. As a non-limiting illustrative example, assume that an application if deployed would have a memory requirement of X gigabytes. Using the matching of capability and requirement parameters of corresponding modeled components, the deployment platform 120 may detect that the requirement of X gigabytes of memory exceeds the memory available for allocation, e.g., Y gigabytes where X>Y, at the selected deployment data center. The non-functional requirement, e.g., the application must be created so as to require less than Y gigabytes of memory may be imposed on the Software architect so that the developed application, which complies with the imposed non-functional requirement can correctly deploy on the available servers at the data center.

As yet another illustrative example, the data center 202 may support a first version of a hardware and/or software component required for deployment of a developed application. Thus, if the Software architect attempts to deploy the software with a second version of the hardware and/or software that is incompatible with the first version, e.g., newer and not backwards compatible, then the software would have to be re-architected. However, the deployment modeling platform 120 is capable of capturing information and knowledge such as versions and version compatibility, e.g., via the discovery and validation extensions 156, 158, and is further configurable to enforce such validation requirements, which may result in avoiding a need to re-architect software to comply with capabilities of the selected data center for deployment.

As still further another example, a Software architect may conventionally assume, for example, that a database server and middleware each reside on the same device. However, the data center 202 selected for deployment may have distributed the database server and middleware. In this regard, the I/T architect may create a topology that identifies the database server and middleware as being anti-colocated. As such, without the knowledge and structure of the deployment modeling platform 120, the developed software application may not be deployable at the data center without reconfiguring either the data center itself, the application or each. Again, the deployment platform 120 may enforce the requirements and capabilities of its modeled components so as to avoid such exemplary deployment problems. The above examples are presented by way of illustration and not by way of limitation to illustrate the influence of the platform 120 on the components it models.

As will be described in greater detail herein, the model created using the deployment modeling platform 120 is open in format so any model can be expressed so long as someone else can read and understand it. According to various aspects of the present invention, the structure provides no defined types in name value pairs. As such, strong type form modeling may be realized. In this regard, the tooling of the deployment modeling platform 120 does not need to understand the user created model extensions. However, the other users should be able to understand them.

A user may drop an unknown domain into the deployment modeling platform 120 and it may automatically show up within the modeling structure. Thus, domains can be created, validated and dropped into the deployment modeling platform 120 in an ad-hoc manner. That is, the user may define a publisher and validator for a created or expanded upon domain. Moreover, the servers can automate configuration as the application evolves from development to testing to deployment. Still further, deployment can now be replicated across multiple operation entities.

According to various aspects of the present invention, the deployment modeling platform 120 provides a mechanism to express best practices for both deployment and development operations. In practice, information may flow back and forth between users within the distributed computing environment. For example, users at an operations center and users at an applications development center may enter information used by the deployment modeling platform 120 to create and use models of the system. Moreover, users can query the model, e.g., to obtain compatibility information. Thus, for example, the application development users may be restricted from performing operations or implementing requirements that the operations center is incapable of fulfilling. Moreover, the topologies may be re-used and the applications developer and deployment architect can quickly and easily become aware of new domains.

The various aspects of the present invention are scalable. As such, if a data center 202 has a plurality of servers, each with different capabilities, then the topologies and models could characterize each server individually. As such, the deployment modeling platform 120 may be utilized by the data center to understand the application that is to be deployed and to select the appropriate server and resources required for the successful deployment of the application.

It is also possible for information stored in one or more models to originate with the application developer and flow to the data center. In this regard, the direction of flow is not limited to any particular configuration.

Figure 7:
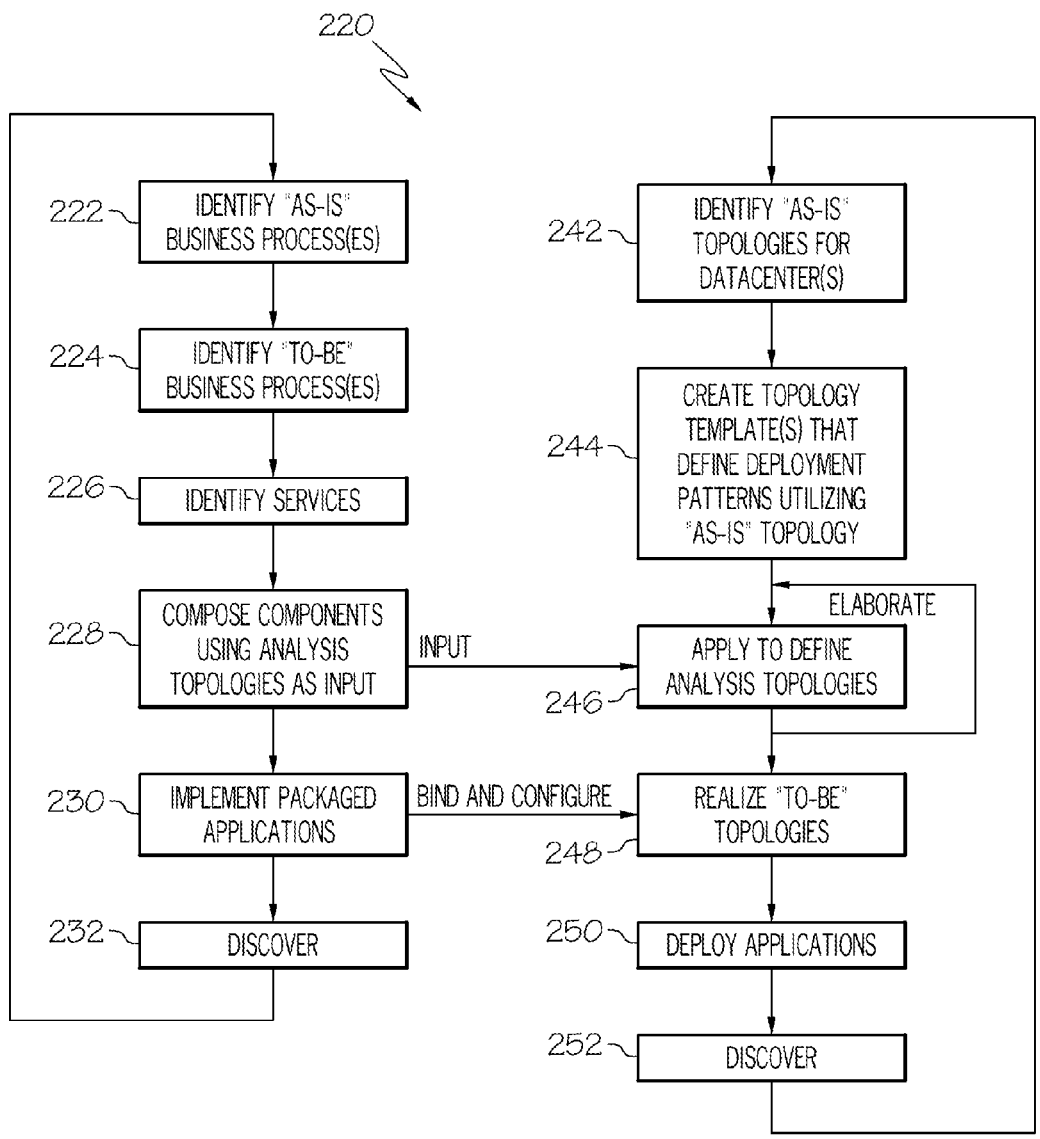
FIG. 7 is a flow chart illustration of a topology lifecycle according to various aspects of the present invention.

Referring to FIG. 7, a flow 220 illustrates service identification and realization life cycles (seen as the flow to the left of FIG. 7) and Topology lifecycles (seen as the flow to the right in FIG. 7). The flow 220 corresponds to the lifecycle described with reference to FIG. 5. A first flow comprises identifying the "As-Is" business processes at 222 and identifying "To-Be" business processes at 224. Business services are identified at 226. Based upon the identified services and business processes at 222, 224 and 226, components are composed at 228. The packaged application is implemented at 230 and a discovery process at 232 indicates that the development of the packaged application may be evolutionary and continue to be updated, e.g., in a circular manner, where applicable.

In a parallel manner, a second flow comprises identifying "As-Is" topologies of the data centers or other locations that are to eventually deploy the developed software at 242. Information may be extracted from the created topologies to create topology template(s), e.g., that define deployment patterns at 244. The models created using the deployment model platform are analyzed at 246. The analysis of the created models may be refined, e.g., based upon information derived from the composed components at 228, and "To-be" topologies are realized at 248. Information regarding the packaged application defined by the service identification and packaging loop may be utilized, for example, for binding and/or configuring the deployed applications based upon the realized "to-be" topologies. The developed applications are deployed at 250, and a discovery process is indicated at 252 to illustrate that the topology lifecycle may be evolutionary and continue to be updated, e.g., in a circular manner, where applicable.

The inner circle represents the business analysis process of identifying process changes, services to support business process, and the aggregation of services into components. In this regard, the application/service design feeds into the Topology Lifecycle as input to the deployment planning process.

This lifecycle can be enlarged to describe the overarching deployment of an entire IT system but it can also be applied in part with smaller cycles as well. Thus each step can happen simultaneously. Also there are multiple loop backs in the cycle. For example there may be multiple deployments from a test management point of view that produce results that may affect the analysis models. These changes would need to be fed back down into development and/or operations to correct the architectural problem and then run the tests again. Tests often move through phases as different aspects of the system are put through different types of tests (capacity, performance, security, etc.).

As noted above, the deployment modeling platform 120 need not be limited to associating a business topology with an infrastructure topology. Rather, the deployment modeling platform 120 generally allows for the creation and association of any number of topologies, thus allowing for a greater level of reuse between the topology models. An example is given below with reference to FIGS. 8-13 for using the deployment modeling platform 120 to associate topologies in general.

Figure 8:
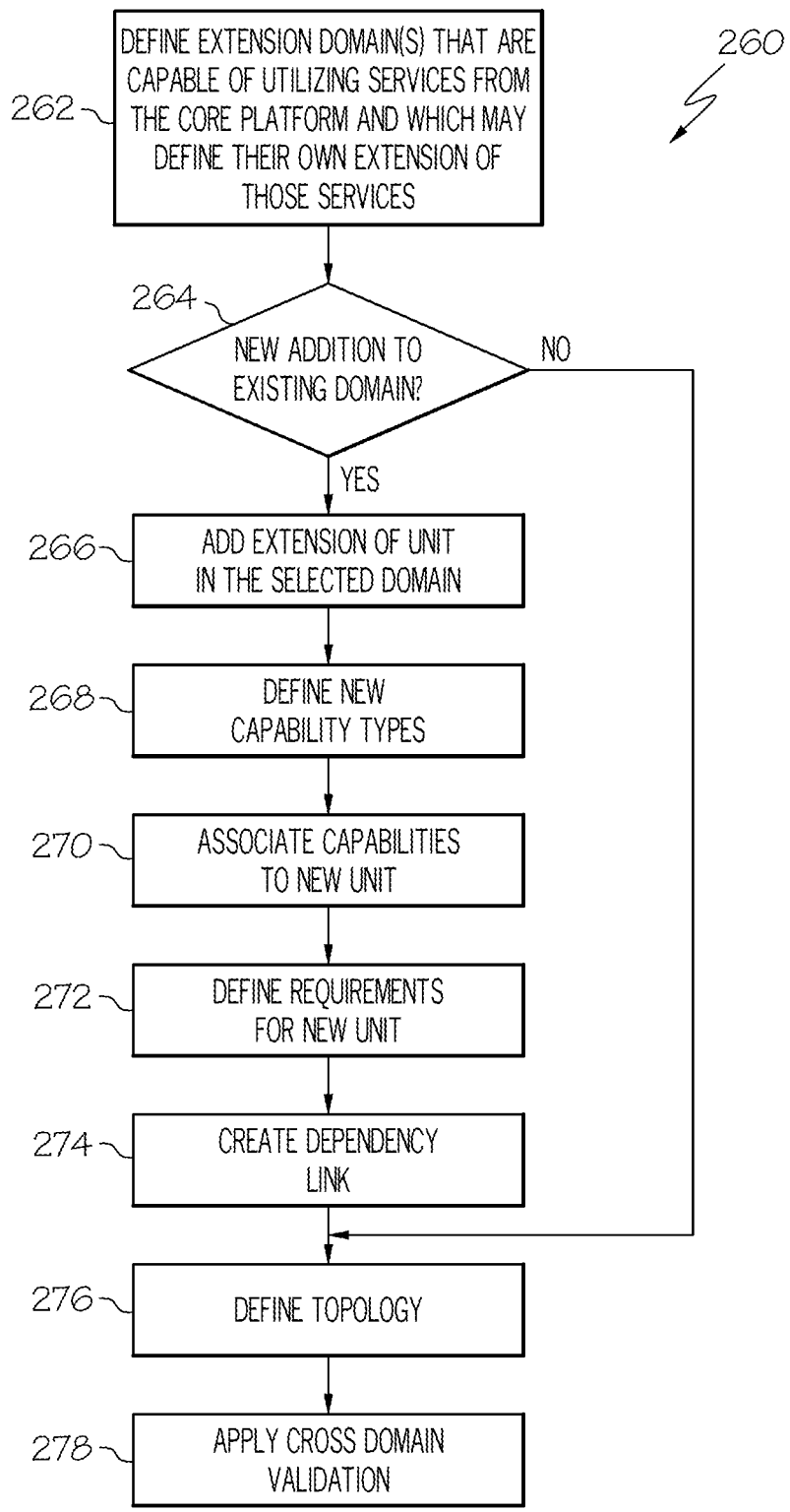
FIG. 8 is a flow chart illustrating a method of implementing a deployment modeling platform according to various aspects of the present invention.

Referring to FIG. 8, a method 260 illustrates an exemplary implementation of the deployment modeling platform 120. Extension domain(s) may be defined at 262 that are fully capable of utilizing the services of the core deployment modeling platform 120. Moreover, the created domain extensions may be able to define their own extensions of those services within the deployment modeling platform 120 that are utilized. A decision is made at 264 that determines whether a new addition is to be made to an existing domain. If an addition is to be made, then an extension of the corresponding unit is made in the selected domain at 266. Moreover, new capabilities may be defined at 268 where appropriate. Also, capabilities are associated with the new unit at 270. Requirements for the new unit are defined at 272 and a dependency link is created at 274. If no addition is to be made to an existing domain, or where the addition to an existing domain has been made, a topology is defined at 276 and cross domain validation may be performed at 278.

Figure 9:
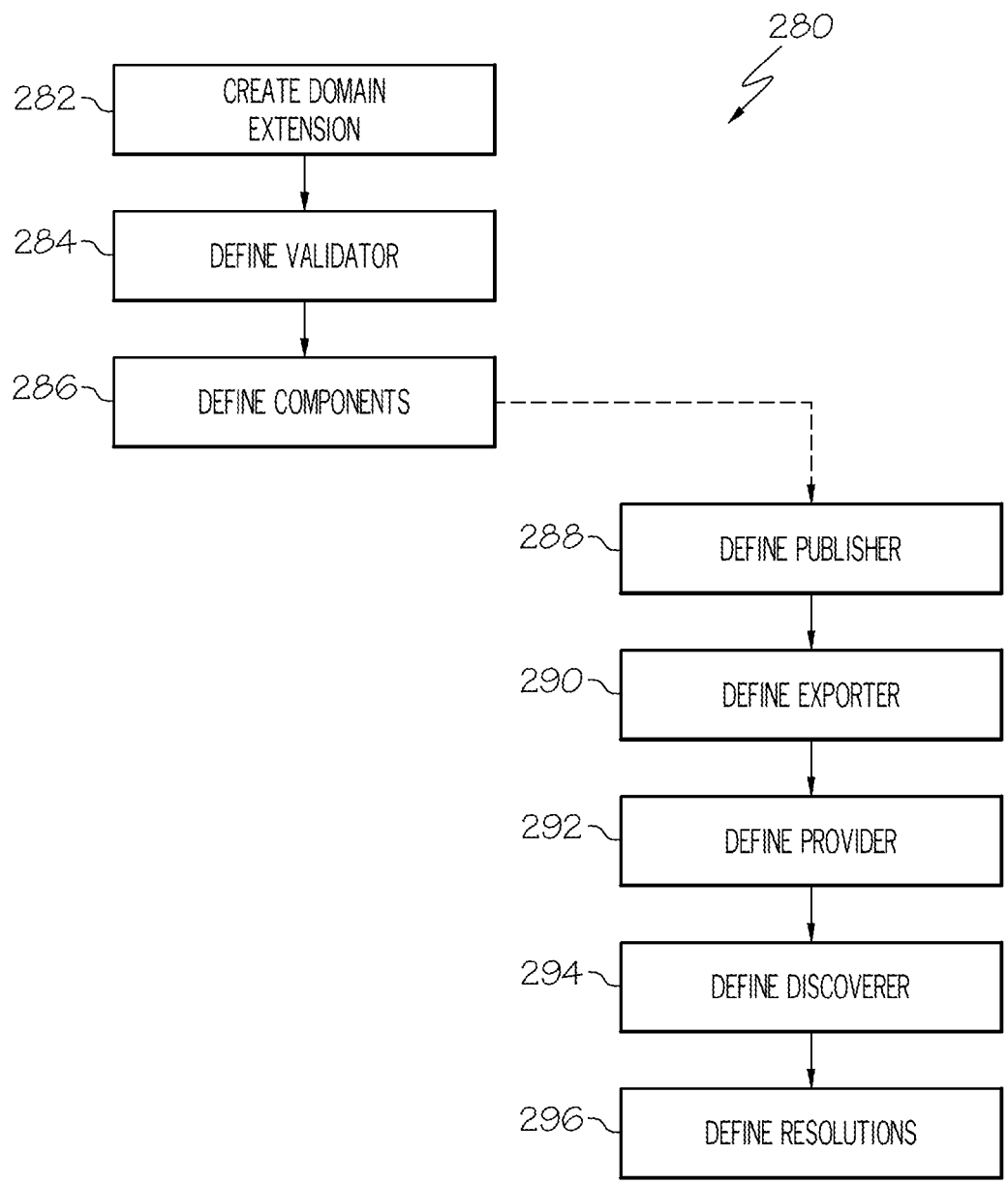
FIG. 9 is a flow chart of a method for defining extensions of domains according to various aspects of the present invention.

With reference to FIG. 9, an exemplary method of implementing the definition of extension domains at 262 in FIG. 8 comprises creating a domain extension at 282, and defining necessary components at 284. As an illustrative example, the method may comprise defining a validator at 286, defining a publisher at 288, defining an exporter at 290, defining a provider at 292, defining a discoverer at 294 and defining resolutions at 294.

A simplified non-limiting example is described below. In the illustrative example, assume that a data center includes an exiting topology that is modeled in the deployment modeling platform 120 by a printing domain. Further, assume that a facsimile machine is to be added to the printing domain. The printing domain may contain many resources, such as Printers, Copiers, etc.

Figure 10:
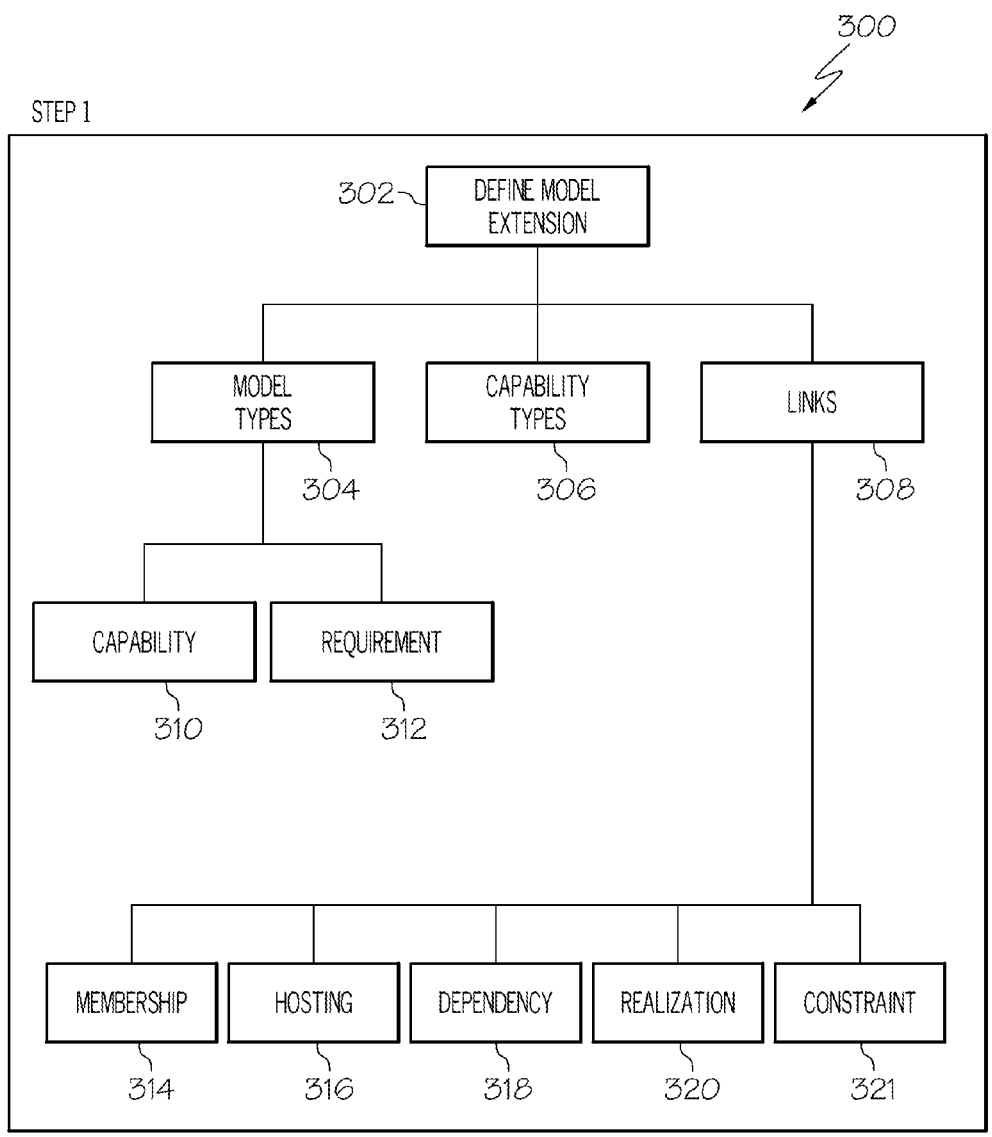
FIG. 10 is a flow chart of a method for defining model extensions according to various aspects of the present invention.
Figure 11:
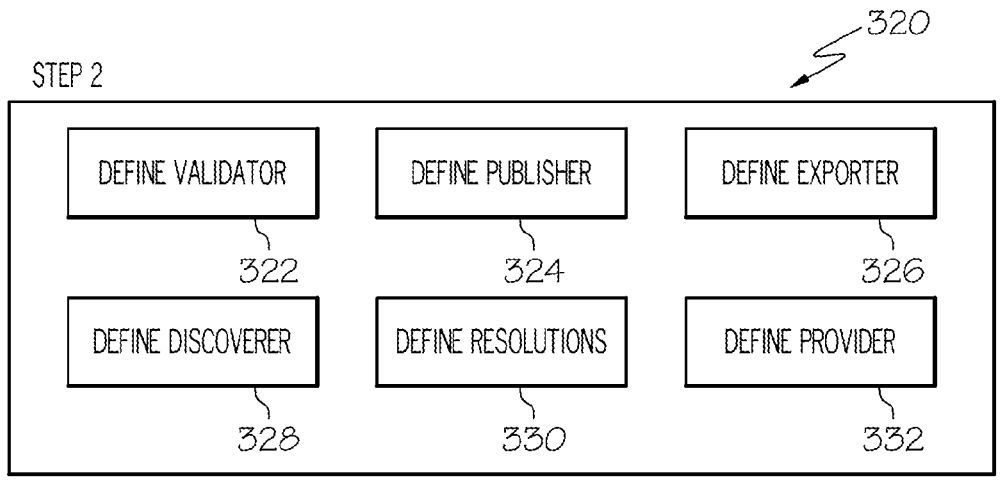
FIG. 11 is a block diagram of definitions that may be configured for defining model extensions according to various aspects of the present invention.

As noted at 262 in FIGS. 8 and 282 in FIG. 9, a new domain extension is created. With reference to FIG. 10, domain model extensions within the Printing domain may be created at 302, such as by defining model types 304, capability types 306 and links 308 for the defined model extension 302. Moreover, the model type 304 may be further refined by defining capabilities 310 and/or requirements 312 of the defined model types 302. Similarly, the links 310 may be refined by further defining the links to include types such as membership at 314, hosting at 316, dependency at 318, realization at 320 and/or constraint at 321.

The printing domain 302 may contain many existing model types 304. In the above illustrative example, domain extensions may have already been created for types such as Printer and Copier that extend the Unit type from the Core deployment modeling platform 120.

Within the model type(s) 304, various capabilities 310 and/or requirements 312 may be defined. For example, the capabilities 310 of an exemplary printer may be modeled within the Model type 304 to include printing 2 sided pages ("Print2SidedPapers"), printing A4 paper ("PrintA4Papers"), and/or other features typically associated with printers. Similarly, an existing copier may be modeled with the model type 304 to include similar types of machine and/or printing specific features. The defined capabilities 310 may also extend the capability type 306 of the model as described in greater detail herein.

As an example, the printer may require that it should be placed on a non static surface to avoid the static charge. This may be represented as a non functional constraint defined within the corresponding "printer unit" in the topology. In this regard, the non-static surface may be listed as a corresponding requirement 312.

As noted above, the association of the capabilities to the Printer type units and/or the Copier type units may be implemented using defined capability types 306, e.g., such that Printer may be capable of Printing A4 papers while the copier may be capable of printing 2 sided papers and also A4 papers. Still further, the Printer and Copier type units may be configured with any other capability types 306 that have been configured in the deployment modeling platform 120.

Dependency link(s) may be created, e.g., where one model type interacts with another model type. The dependency link will be described in greater detail herein.

As an illustrative example, the printer may be realized as a Brand X printer in room R1 and the copier may be realized as Brand Y copier that is also in R1. This observation may be represented as a realization relationship 320 and provides a means of realizing the same topology over a repeated set of deployments keeping the core relationships and constraints applicable to the realized environments. Such a realization may not be allowed by the deployment modeling platform 120, if, for example, the Brand X printer does not support the capabilities associated with the printer in the model type 304, e.g., if the Brand X printer does not extend the capability of printing on A4 paper as required by the printer model type in the illustrative example.

Still further, a number of links may be implemented. Assume for purposes of illustration, that the Printer and the Copier are kept in Room R1. Further, assume for purposes of illustration that room R1 is in Building B1. Then R1-B1 may be represented with a member relationship. That is, R1 may be defined as a member 314 of location B1. B1 may itself be a member of a larger organization, etc.

Referring back to FIG. 8, block 262 and FIG. 9, blocks 284-296, necessary extensions may be defined. For example, with reference to FIG. 11, a validator may be defined at 322 that validates the printing domain units for their extended constraint or requirement validations. As an example, a printer only requires 110 volts power supply in locations that are in American Subcontinent while in Europe and Asia, a corresponding printer requires 220 Volts. As another example, keeping with the above-illustrative facts, the printer may have a requirement that it is placed on a non-static surface. If the printer is not placed on a non-static surface, then a validation rule may be created that identifies the constraint as violated if the printer is not on a non-static surface.

A publisher may be defined at 324. For example, the publisher may publish the drivers that are required to run the printer hardware. Similarly, an exporter may be defined at 326. The exporter may define the topology into an archival file with the set of resource or firmware or software requirements that the printer installation needs.

A discoverer may be defined at 328 that is capable of introspecting different locations for printer installations. The resolutions 330 may also be defined, e.g., such that driver mismatch problems can be resolved based on the vendor of the realized printer. The defined provider allows, for example, an existing printer definition to be dragged from any repository, e.g., for integration into a system implementation.

The above steps basically define an extension domain that is fully capable of utilizing the services from the core deployment modeling platform and as well as define their own extension of those services. The next steps illustrate the modifications as knowledge is gained in how to improve the system or how to incorporate new types come to existence. It also shows how to cross the domain and provide extended services that operate on the information from more than one domain.

Figure 12:
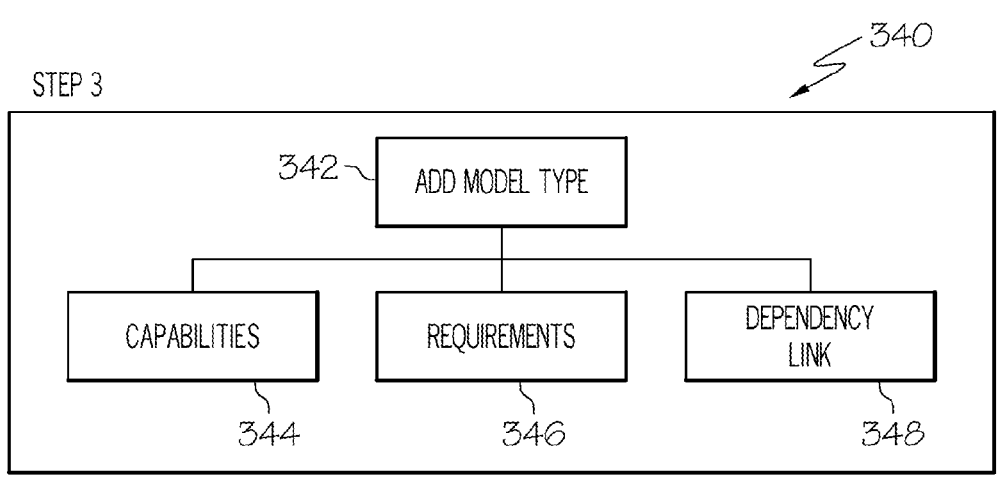
FIG. 12 is a block diagram of adding model types to a domain according to various aspects of the present invention.

Referring to FIG. 12, assume that there is to be a new addition to a printer domain in an organization. In the illustrative example, assume that a Facsimile machine is to be added to the printing domain. A Fax Type may be added as the model type as an extension of the unit in the printing domain at 342. This corresponding to the model type 304 in FIG. 10. The capability types that may be facilitated by the newly added facsimile machine may also be added. For example, capability types may include Fax to Phone (FaxToPhone), Fax to email (FaxToEmail), Fax to portable document format (FaxToPDF), etc. Each of the capability types implemented by the particular new facsimile machine may be associated with the new Fax unit as Fax capabilities 344, corresponding to the capabilities 310 of FIG. 10. Requirements may also be defined at 346. As an illustrative example, the facsimile machine may require a printer to print transmission reports, etc. Further, a dependency link is created at 348. For example, as noted above, a requirement specifies that the facsimile machine utilizes a printer to print transmission reports. As such, a dependency link is created from the facsimile machine to the printer.

In the exemplary environment, further assume that computers are provided, which require printing services. In this regard, a topology may be defined to express that dependency requirement. The deployment modeling platform 120 may thus validate for any errors on that dependency.

Keeping with the above example, assume that a processing device, e.g., a laptop computer, desktop computer, etc., requires a printer that allows for network printing. The deployment modeling platform 120 validates that requirement to the capability of the printer in the printing domain. In this regard, the deployment modeling platform 120 may produce errors and present resolutions to the user, e.g., via the graphical user interface 130, to correct the detected problems.

Figure 13:
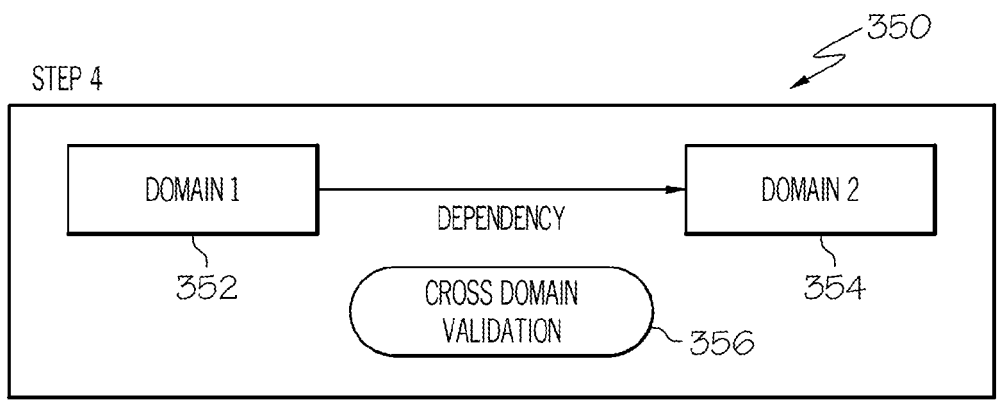
FIG. 13 is a block diagram of implementing cross domain validation according to various aspects of the present invention.

With reference to FIG. 13, cross domain validation can be provided. For example, a processing device, e.g., a laptop computer from computer manufacturer A in a first domain 352 must have a specific version of a pooling driver to work with a specific printer from printer manufacturer B, which resides in a second domain 354. Thus, cross validation 356 may be performed to promote interoperability.

Moreover, the Printer and facsimile may be represented as a hosting relationship 316 in the model extension 302.

Figure 14:
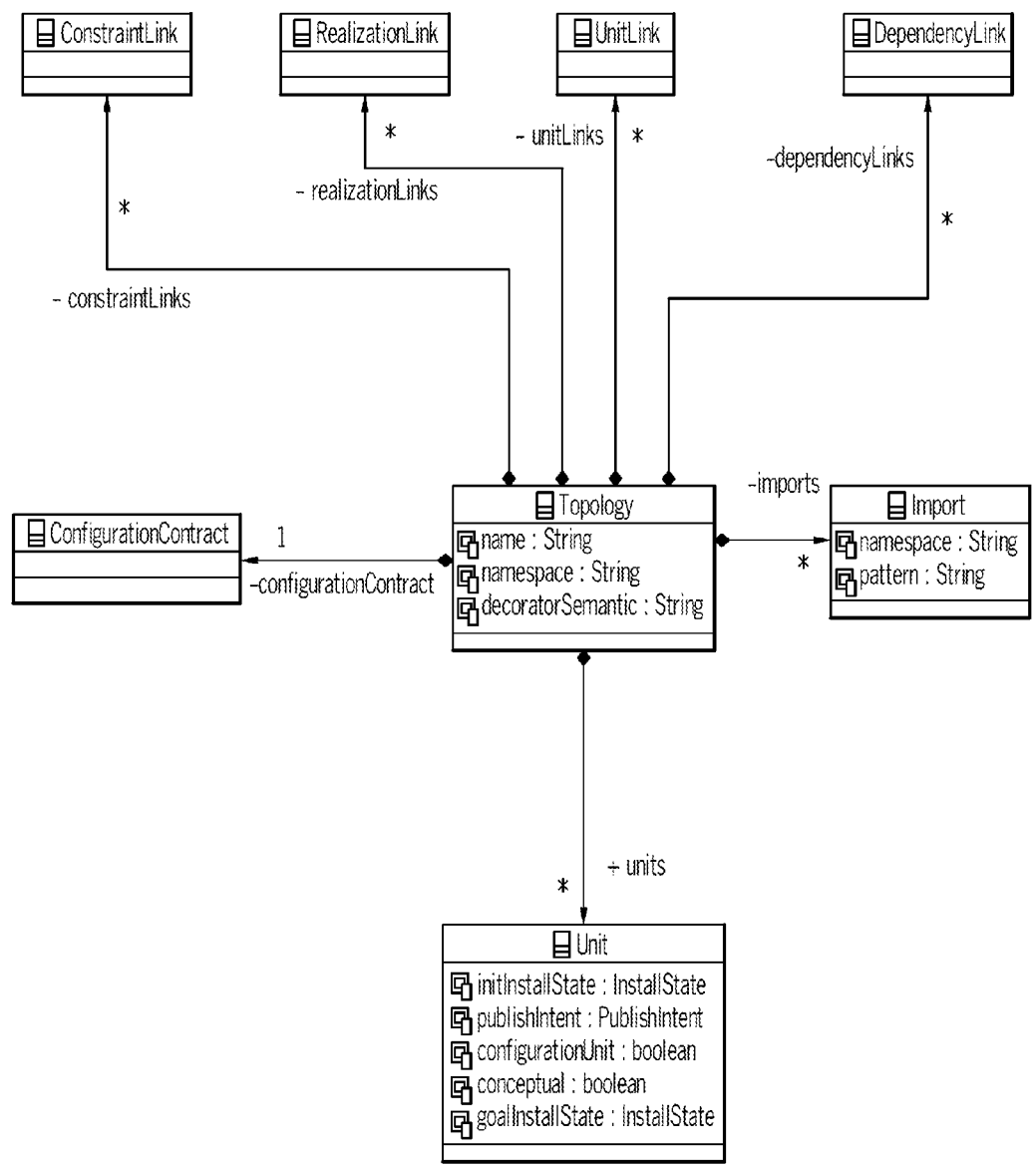
FIG. 14 is a diagram of an exemplary Topology Model according to various aspects of the present invention.
Figure 15:
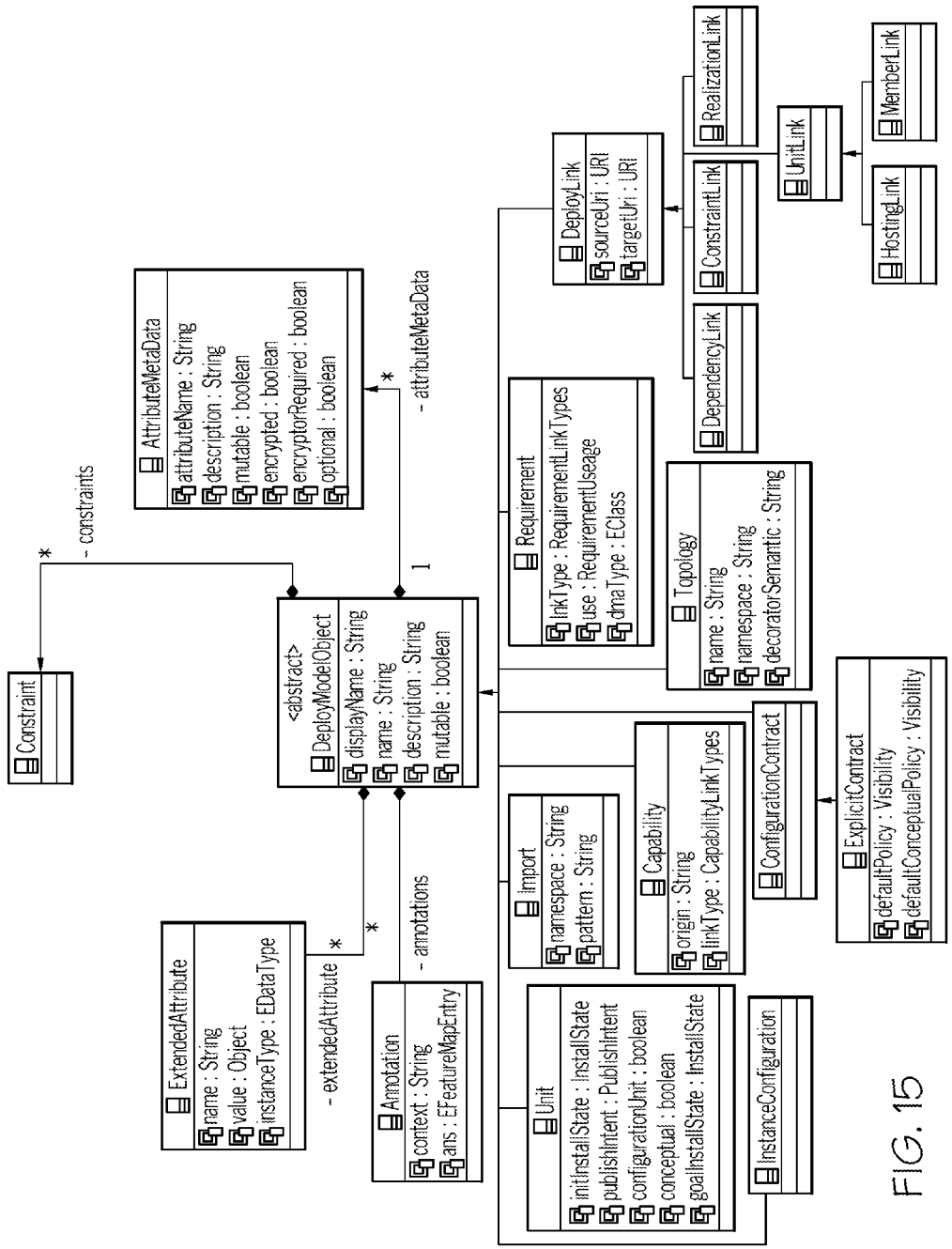
FIG. 15 is a diagram of an exemplary DeploymentModelObject according to various aspects of the present invention.
Figure 16:
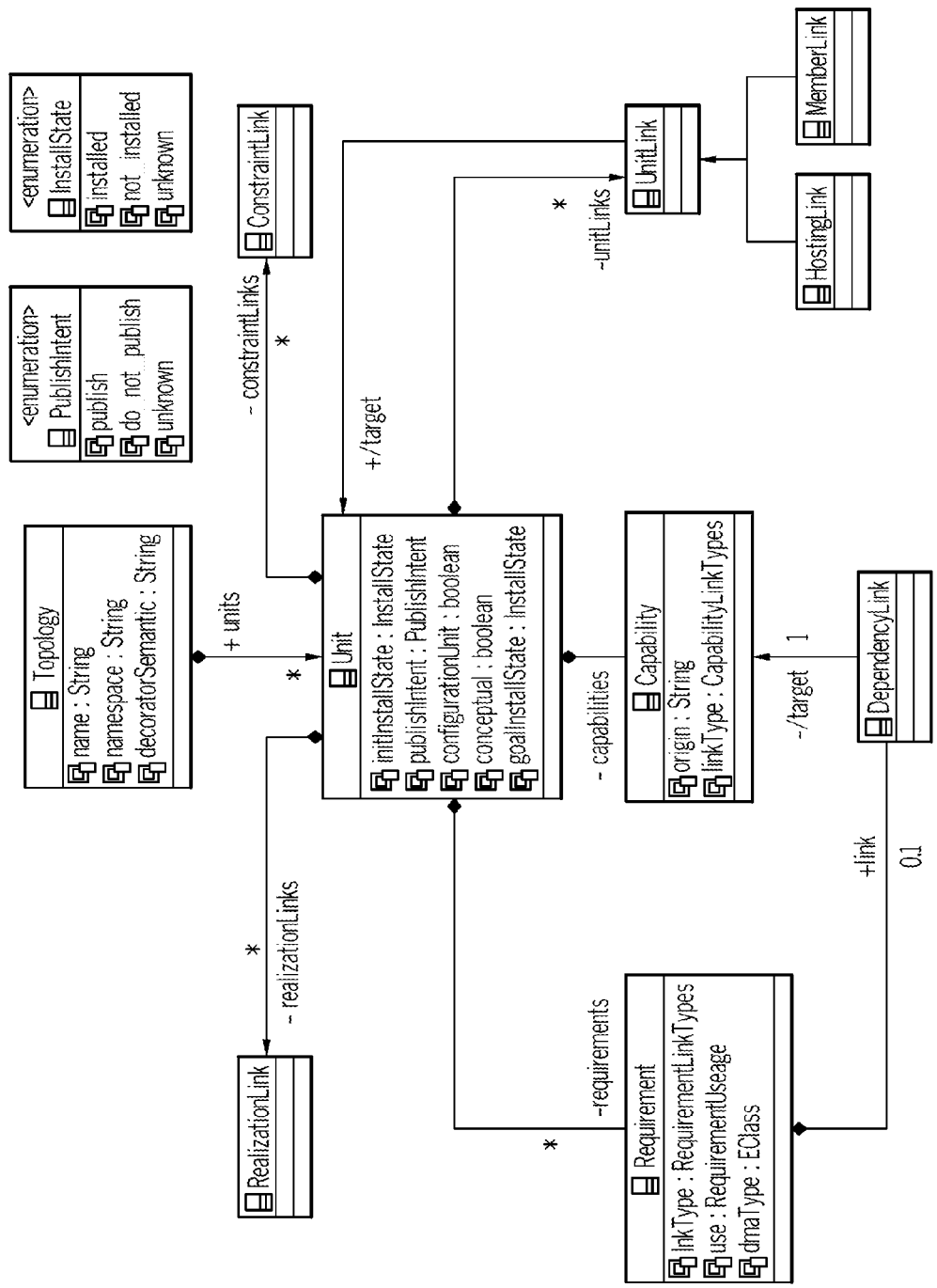
FIG. 16 is a diagram of an exemplary Unit Model according to various aspects of the present invention.
Figure 17:
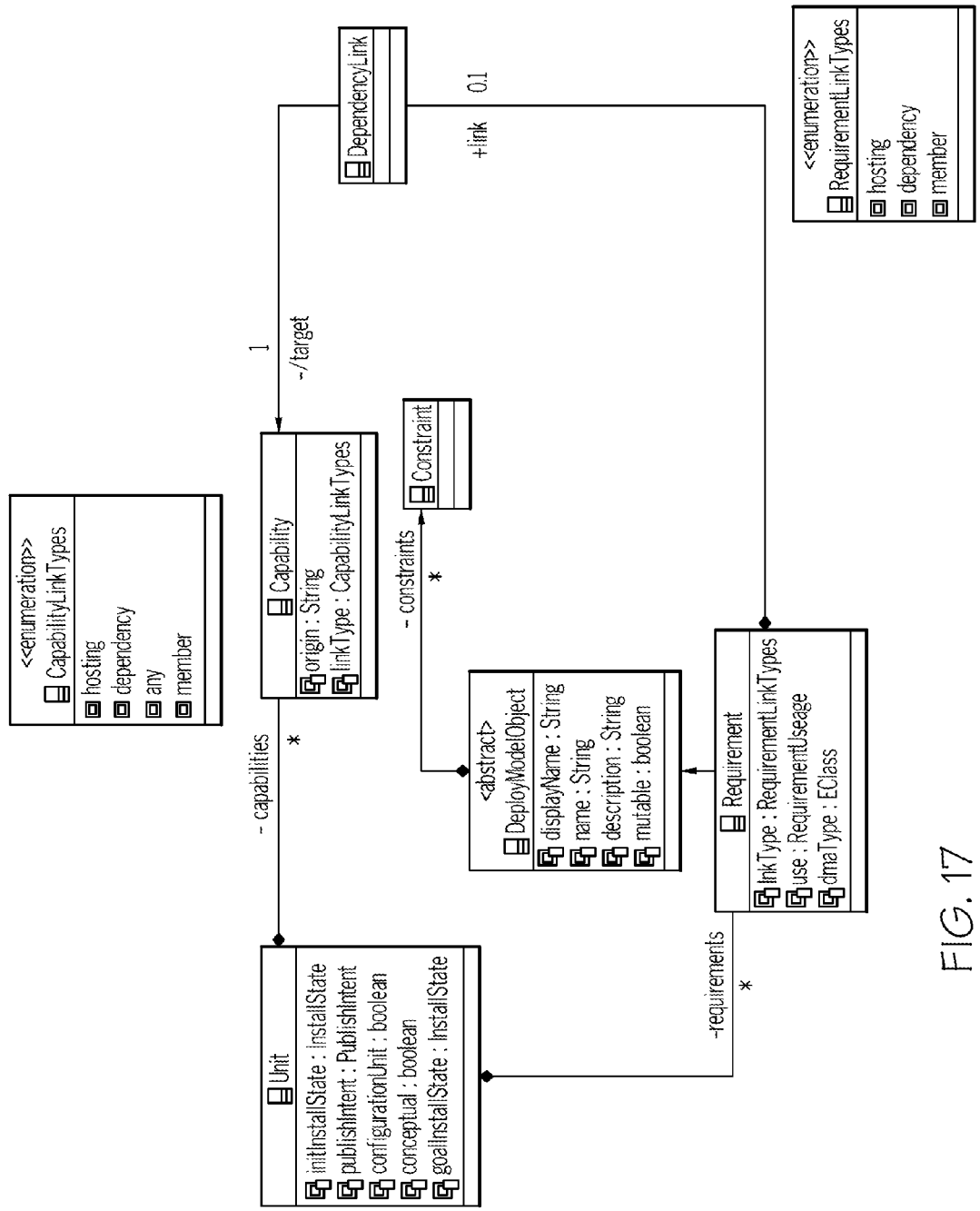
FIG. 17 is an exemplary diagram of a Requirement Model according to various aspects of the present invention.

According to aspects of the present invention, the Unified Modeling Language may be utilized as a visual language for specifying, constructing, and documenting the artifacts of the deployment modeling platform 120. An exemplary topology model is illustrated in FIG. 14. Correspondingly, an exemplary deployment object model is illustrated in FIG. 15. An exemplary unit model is illustrated in FIG. 16, and a requirement object model is illustrated in FIG. 17.

Figure 18:
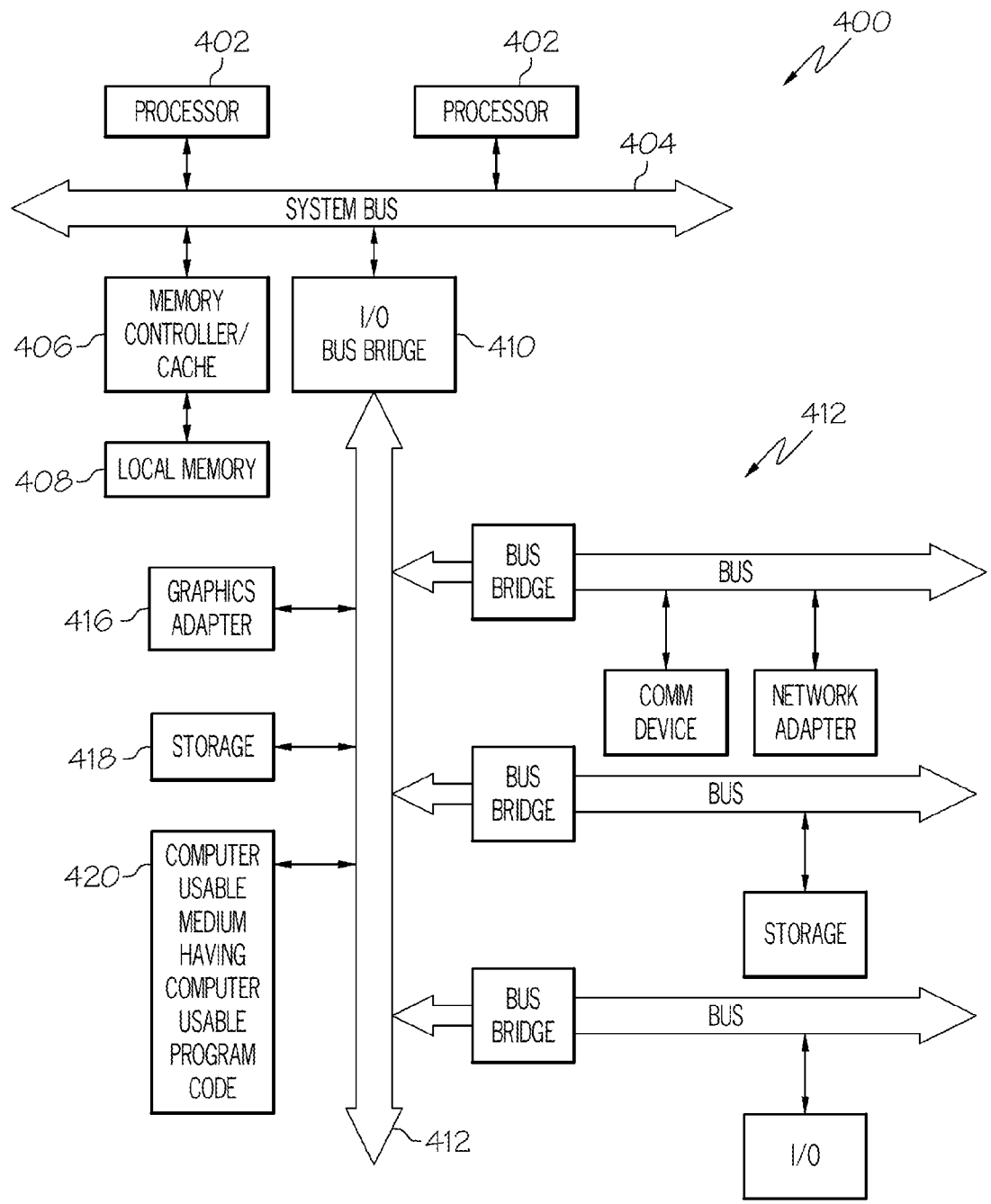
FIG. 18 is a block diagram of an exemplary computer system including a computer usable medium having computer usable program code embodied therewith, where the exemplary computer system is capable of executing a computer program product to implement one or more aspects of deployment modeling according to various aspects of the present invention.

Referring to FIG. 18, a block diagram of a data processing system is depicted in accordance with the present invention. A data processing system 400, such as may be utilized to implement the deployment modeling platform or aspects thereof, e.g., as set out in greater detail in FIGS. 1-17, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more busses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present invention, for example, to implement aspect of any of the methods, computer program products and/or system components illustrated in FIGS. 1-17.

The data processing system depicted in FIG. 18 may be, for example, an IBM RS/6000 system, a product of International Business Machines Corporation in Armonk, N.Y., running the Advanced Interactive Executive (AIX) operating system. An object oriented programming system such as Java may run in conjunction with the operating system and provides calls to the operating system from Java programs or applications executing on data processing system.

The various aspects of the present invention may be embodied as systems, computer-implemented methods and computer program products. Also, various aspects of the present invention may take the form of an entirely hardware embodiment, an entirely software embodiment (including software, firmware, micro-code, etc.) or an embodiment combining software and hardware, wherein the embodiment or aspects thereof may be generally referred to as a "circuit," "component" or "system." Furthermore, the various aspects of the present invention may take the form of a computer program product on a computer-usable storage medium having computer-usable program code embodied in the medium or a computer program product accessible from a computer-usable or computer-readable medium providing program code for use by or in connection with a computer or any instruction execution system.

The software aspects of the present invention may be stored, implemented and/or distributed on any suitable computer usable or computer readable medium(s). For the purposes of this description, a computer-usable or computer readable medium can be any apparatus that can contain, store, communicate, propagate, or transport the program for use by or in connection with the instruction execution system, apparatus, or device. The computer program product aspects of the present invention may have computer usable or computer readable program code portions thereof, which are stored together or distributed, either spatially or temporally across one or more devices.

The present invention is described with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams may be implemented by system components or computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, one or more blocks in the flowchart or block diagrams may represent a component, segment, or portion of code, which comprises one or more executable instructions for implementing the specified logical function(s). In some alternative implementations, the functions noted in the blocks may occur out of the order noted in the figures. For example, two blocks shown in succession may, in fact, be executed substantially concurrently or in the reverse order.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A method for implementing a deployment modeling platform, comprising:
   using a graphic user interface of a processing device to model application characteristics of target software by associating application modeling parameters to the modeled application characteristics;
   using a graphic user interface of a processing device to model environment characteristics of a target deployment environment by associating environment modeling parameters to the modeled deployment environment characteristics;
   using a graphic user interface of a processing device to create a deployment model that associates and maps selected parameters of the modeled application characteristics of the target software to associated parameters of the modeled environment characteristics of the deployment environment;
   verifying that each parameter of the deployment model specified for an associated one of the modeled environment characteristics and modeled application characteristics that relates to a requirement is mapped to and is fulfilled by an associated parameter of the deployment model specified for one of the modeled environment characteristics and modeled application characteristics that relates to a corresponding capability to determine whether validation problems exist in order to deploy the target software in the associated deployment environment; and
   conveying any determined validation problems to a user, wherein the modeled target application characteristics are checked against a corresponding modeled deployment environment.

2. The method according to claim 1, wherein using a graphic user interface of a processing device to model application characteristics of target software by associating application modeling parameters to the modeled application characteristics comprises:
   associating application modeling parameters including at least one of checks, constraints, requirements and capabilities.

3. The method according to claim 1, wherein using a graphic user interface of a processing device to model environment characteristics of a target deployment environment by associating environment modeling parameters to the modeled deployment environment characteristics comprises:
   associating environment modeling parameters including at least one of an environment capability and an environment requirement.

4. The method according to claim 3, wherein associating environment modeling parameters comprising at least one of an environment capability and an environment requirement further comprises:
   constraining deployment of the target software so as to:
      capture at least one of functional requirements and non-functional properties of the deployment environment, and to
      associate at least one of restrictions and requirements to the modeled deployment environment.

5. The method according to claim 1, wherein:
   using a graphic user interface of a processing device to model application characteristics of target software by associating application modeling parameters to the modeled application characteristics comprises:
      modeling application characteristics including business requirements and workflows implemented by the software; and
   using a graphic user interface of a processing device to model environment characteristics of a target deployment environment by associating environment modeling parameters to the modeled deployment environment characteristics comprises:
   modeling environment characteristics including at least one of:
      hardware availability, hardware capability, hardware requirements, software availability, software capability, software requirements, and hardware and software interoperability requirements.

6. The method according to claim 1, wherein using a graphic user interface of a processing device to create a deployment model that associates and maps selected parameters of the modeled application characteristics of the target software to associated parameters of the modeled environment characteristics of the deployment environment comprises:
   binding the modeled application characteristics to associated resource requirements and capabilities of modeled environment characteristics and to resolve interoperability issues that would prevent deployment of the target software on the deployment environment.

7. The method according to claim 1, further comprising:
   defining models based upon a common unit model framework that can be utilized to model specific instances of domain representations; and
   implementing a declarative extension mechanism that allows software contributions to be linked to an associated unit model following defined patterns of behavior such that third party contributors may act on the associated unit model.

8. The method according to claim 1, further comprising:
   using a graphic user interface of a processing device to define "yet to be created" models.

9. The method according to claim 1, wherein using a graphic user interface of a processing device to create a deployment model that associates and maps selected parameters of the modeled application characteristics of the target software to associated parameters of the modeled environment characteristics of the deployment environment further comprises:
   verifying that requirements specified for an associated model are fulfilled by matching requirements against one or more capabilities of other models using various links including at least one of a dependency link, a hosting link, a constraint link a realization link and a member link.

10. The method according to claim 1, wherein verifying that each parameter specified for an associated one of the modeled environment characteristics and modeled application characteristics that relates to a requirement is mapped to and is fulfilled by an associated parameter specified for one of the modeled environment characteristics and modeled application characteristics that relates to a corresponding capability to determine whether validation problems exist in order to deploy the target software in the associated deployment environment further comprises:
   performing automatically, at least one of locating and resolving requirement matches.

11. The method according to claim 1, further comprising driving automated deployment and configuration of target software in a target deployment environment where the corresponding modeled application characteristics and associated modeled resource requirements and capabilities have been validated.

12. The method according to claim 1, further comprising defining the modeled application characteristics and associated modeled environment characteristics by topologies implemented as a hierarchy/tree view that comprises:
- a top layer that places a logical analysis at the top of the hierarchy, which utilizes a repeated process of elaboration to define an analysis topology that deals with component placement;
- an intermediate layer in the hierarchy that corresponds to a physical analysis; and
- a bottom layer of deployment instances.

13. The method according to claim 1, further comprising implementing templates as models that are stripped of details of an associated instance, but retain requirements and capabilities.

14. The method according to claim 1, wherein:
using a graphic user interface of a processing device to model environment characteristics of a target deployment environment by associating environment modeling parameters to the modeled deployment environment characteristics further comprises:
- creating reusable, cross-domain template models that constrain deployment to the current state of computing capabilities and requirements of the deployment environment; and
- extracting deployment patterns from the template models to create information technology templates which are representative of the target environment that serves as an input into a solution design;

using a graphic user interface of a processing device to model application characteristics of target software by associating application modeling parameters to the modeled application characteristics further comprises:
- capturing the deployment requirements of the target software and associating the captured deployment requirements with associated information technology templates so that the information technology templates serve as the hosting target of application components that are intended to be deployed; and
- creating applications templates that capture the capabilities and requirements of components of the target software application;

and wherein using a graphic user interface of a processing device to create a deployment model that associates and maps selected parameters of the modeled application characteristics of the target software to associated parameters of the modeled environment characteristics of the deployment environment further comprises:
- fulfilling requirements and constraints of the information technology templates and applications templates to produce a fully resolved to-be model that represents the desired state of the deployment environment after publication of the target software, wherein the to-be model may be utilized to bind and configure the associated deployment environment for deployment of the developed target software application.

* * * * *